(12) United States Patent
Bendel et al.

(10) Patent No.: US 10,585,909 B2
(45) Date of Patent: *Mar. 10, 2020

(54) TASK-EXECUTION IN A DBMS USING STORED PROCEDURES

(71) Applicant: INTERNATIONAL BUSINESS MACHINES CORPORATION, Armonk, NY (US)

(72) Inventors: Peter Bendel, Holzgerlingen (DE); Nicole Ying Finnie, Boeblingen (DE); Claus Kempfert, Altdorf (DE); Knut Stolze, Hummelshain (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 369 days.

This patent is subject to a terminal disclaimer.

(21) Appl. No.: 15/270,301

(22) Filed: Sep. 20, 2016

(65) Prior Publication Data

US 2017/0097970 A1    Apr. 6, 2017

(30) Foreign Application Priority Data

Oct. 2, 2015  (GB) .................................. 1517416.2

(51) Int. Cl.
*G06F 16/22*    (2019.01)
*G06F 16/25*    (2019.01)

(52) U.S. Cl.
CPC ............ *G06F 16/254* (2019.01); *G06F 16/22* (2019.01); *G06F 16/252* (2019.01)

(58) Field of Classification Search
CPC ...... G06F 16/254; G06F 16/22; G06F 16/252; G06F 16/25

USPC .................................... 707/760; 726/27, 769
See application file for complete search history.

(56) References Cited

U.S. PATENT DOCUMENTS

| | | | | |
|---|---|---|---|---|
| 5,768,589 A | * | 6/1998 | Bradley | .............. G06F 16/2443 707/E17.005 |
| 6,480,953 B1 | | 11/2002 | Hughes | |
| 6,519,601 B1 | * | 2/2003 | Bosch | .................... G06Q 50/22 707/E17.032 |
| 6,636,855 B2 | | 10/2003 | Holloway et al. | |

(Continued)

OTHER PUBLICATIONS

IBM "List of IBM Patents or Patent Application Treated as Related"; (Appendix P), Filed May 14, 2019; 2 Pages.

*Primary Examiner* — Anh Ly
(74) *Attorney, Agent, or Firm* — Cantor Colburn LLP; Robert Bunker

(57) ABSTRACT

A method for executing a computational task in a data management system is provided. The method includes storing a first stored procedure in a first database management system (DBMS) including first data containers. The first stored procedure receives names of one or more of the first data containers to act as input or output data containers and includes first statements for triggering resolution of features of a respective first input or output data container. The method also includes storing a second stored procedure in a second DBMS including second data containers. The second stored procedure implements the computational task and operates on one or more of the second data containers. The method also includes receiving, by the first DBMS, a request from a client application to perform the computational task.

20 Claims, 3 Drawing Sheets

(56) References Cited

U.S. PATENT DOCUMENTS

| | | |
|---|---|---|
| 7,448,047 B2 | 11/2008 | Poole et al. |
| 7,516,134 B2 | 4/2009 | Erwin |
| 8,056,141 B2 | 11/2011 | Shulman et al. |
| 8,639,670 B2 | 1/2014 | Kazuo |
| 9,128,990 B2 | 9/2015 | Teletia et al. |
| 9,678,679 B2 | 6/2017 | Chen et al. |
| 9,773,041 B2 | 9/2017 | Cruanes et al. |
| 9,934,277 B2 | 4/2018 | Bendel et al. |
| 9,973,374 B1 | 5/2018 | Ratias |
| 10,095,861 B2 | 10/2018 | Bendel et al. |
| 10,114,615 B1* | 10/2018 | Sowa .................... G06F 16/278 |
| 10,210,327 B2 | 2/2019 | Bendel et al. |
| 10,255,302 B1* | 4/2019 | Cosic ..................... G06F 3/011 |
| 2002/0055921 A1 | 5/2002 | Mitsuhiko |
| 2005/0050073 A1* | 3/2005 | Demiroski ............ G06F 16/178 707/999.1 |
| 2005/0223047 A1* | 10/2005 | Shah .................. G06F 16/1787 707/E17.01 |
| 2010/0185645 A1* | 7/2010 | Pazdziora ......... G06F 17/30389 707/760 |
| 2013/0346363 A1* | 12/2013 | Arakawa ................ G06F 16/27 707/610 |
| 2015/0046427 A1 | 2/2015 | Asaad et al. |
| 2015/0199395 A1* | 7/2015 | Greenstein ............ G06F 16/211 707/611 |
| 2016/0293019 A1* | 10/2016 | Kim .................... G08G 5/0069 707/E17.032 |
| 2018/0365413 A1 | 12/2018 | Bendel et al. |

\* cited by examiner

TASK-EXECUTION IN A DBMS USING STORED PROCEDURES

FOREIGN PRIORITY

This application claims priority to United Kingdom Application No. 1517416.2 filed on Oct. 2, 2015 and all the benefits accruing therefrom under 35 U.S.C. § 119, the contents of which in its entirety are herein incorporated by reference.

BACKGROUND

The disclosure relates to database management systems, and more specifically, to database management systems comprising stored procedures.

The capability to manage large data volumes and a plurality of OLTP (online transactional processing) as well as OLAP (online analytical processing) queries to be performed on said data volumes has become an important aspect for data warehouse design. Often, OLTP queries perform better on database tables of a particular structure that may be unsuited for efficiently performing OLAP queries and vice versa. To overcome the problems associated with different kinds of database queries requiring different data structures, systems have been developed which comprise two or more database management systems (DMBSs) with differently structured database tables. The data of one of said databases is—partially or completely—synchronized with the data of the one or more other databases of the system. In such systems, there may exist queries which can be performed more quickly on the source DBMS while other queries can be performed more quickly on one of the other DBMS of the system.

SUMMARY

According to one embodiment, a method for executing a computational task in a data management system is provided. The method comprises storing a first stored procedure in a first database management system (DBMS) comprising first data containers, the first stored procedure being configured to receive names of one or more of the first data containers to act as input or output data containers, and the first stored procedure comprising first statements configured for triggering resolution of features of a respective first input or output data container; storing a second stored procedure in a second DBMS comprising second data containers, the second stored procedure implementing the computational task, and the second stored procedure being configured to operate on one or more of the second data containers; receiving, by the first DBMS, a request from a client application to perform the computational task; in response to receiving the request: starting to execute, by the first DBMS, the first stored procedure, the first DBMS thereby obtaining statements directed at one or more of the first data containers, the obtained statements comprising the first statements, at least one of the obtained first statements being directed at a first data container being a first view, evaluating, by the first DBMS, a synchronization mapping specifying from which ones of the first data containers data is transferred to which ones of the second data containers in a synchronization process between the first and the second DBMSs, the evaluating of the synchronization mapping identifies one or more second tables mapped to any one of the first data containers the obtained statements are directed at, selectively labeling, by the first DBMS, the ones of the obtained statements which are first statements, rewriting, by the first DBMS, the obtained statements for providing rewritten statements being interpretable by the second DBMS, the rewriting comprising replacing first data container names in the obtained statements by their respectively mapped second container names, and selectively assigning, by the first DBMS, each rewritten and labeled statement a task-ID of the requested computational task and a container-ID of the first data container specified in the first statement said rewritten and labeled statement was derived from; receiving, by a receiver module being operatively coupled to the second DBMS, the rewritten statements, at least one of the rewritten statements being labeled; in case the received rewritten statement is labeled, notifying, by the receiver module, the first DBMS that the rewritten labeled statement was received, the notification being performed without executing the labeled statement in the second DBMS; and upon the receiver module having received a rewritten labeled statement at least for each of the first statements, triggering, by the first stored procedure or the receiver module, the execution of the second stored procedure in the second DBMS, the receiver module thereby using the task-ID and the container-ID of each received rewritten labeled statement for identifying the second stored procedure implementing the requested computational task and for identifying the ones of the second data containers to be used as input or output data containers by the second stored procedure for performing the requested computational task in the second DBMS.

The above method can be implemented as a system and/or computer program product.

Additional features and advantages are realized through the techniques of the present disclosure. Other embodiments and aspects of the disclosure are described in detail herein. For a better understanding of the disclosure with the advantages and the features, refer to the description and to the drawings

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

Figure 1:
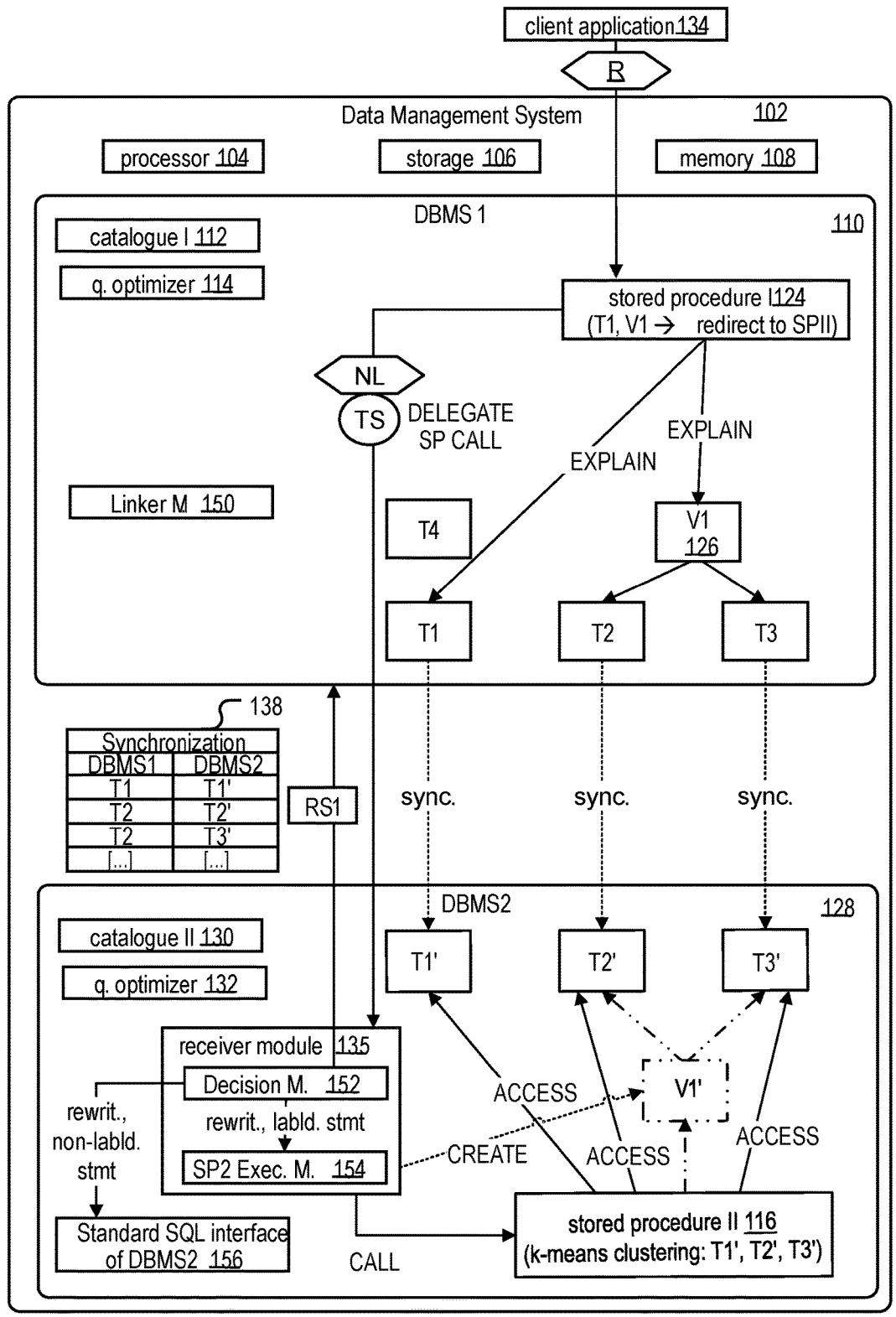
FIG. 1 depicts a system comprising a first and a second DBMS according to an embodiment.

Embodiments herein may have the advantage that a client may not need to "know" in which one of the DBMS a particular query has the minimum execution time in order to direct the query to the appropriate DBMS and/or may not need to "know" in which one of the DBMSs of the system a respective stored procedure ("SP") is implemented for calling said stored procedure. This may allow to avoided a tight coupling of client and database server and thus may allow reducing maintenance costs.

Embodiments herein may have the advantage that dynamically dispatching a query from one DBMS of the system to the other is enabled even in case the query is highly complex and even in case the table structure of the first and second DBMS differ structurally. The dispatching may even be possible in case the second DBMS may lack functionally corresponding views and/or database-internal functions of the first DBMSs e.g. at the moment of receiving a request.

Embodiments herein may have the advantage that the dispatching of computational tasks involving accessing one or more views in the first DBMS is made possible in a very flexible and generic manner. Even in case the second DBMS should not comprise a view that corresponds to the first view of the first DBMS, embodiments herein allow resolving the view specification and table names of the first view automatically, to communicate the result view in the form of a written statement to the second DBMS and to receive a confirmation that the second DBMS has received the resolved table names and view specification (the rewritten very string) and thus is able to perform a statement originally directed at the first view also in the second DBMS.

In a further beneficial aspect, the assignment of a task ID and a container ID to rewritten, labeled statements and the different processing paths for labeled and non-labeled statements may have the advantage that the receiver module may be enabled to decouple "decision aspects" from "procedure execution aspects": the receiver module may receive from the first DBMS a plurality of different statements, some to be executed right away in the second DBMS via a standard SQL interface, some to be processed separately in order to use said statements for providing the second stored procedure with information on which second data containers to use as input and output data containers and which kind of statements to perform in order to obtain the same (intermediate) results as would be contained when calling or using a first-DBMS-specific view or further stored procedure. Thus, it may be possible to implement a receiver module which may be capable of processing any kind of statement received from the first DBMS, those to be executed immediately ("second statements" which are not to be labeled") and statements ("first statements" which are to be labeled" which are to be used mainly for resolving input and output table names, view specifications, UDFs and/or other complex expressions of the called first SP for enabling execution of the requested computational task in the context of the second DBMS. By assigning task-IDs and container-IDs selectively to labeled statements, the receiver module is enabled to control and manage the execution of the requested computational task via the SP2 and the corresponding processing of view resolution statements separate from the processing of other, non-labeled statements received by the receiver module e.g. for direct processing in the DBMS2.

According to embodiments, the first SP calls, upon being notified that the second DBMS received, for each of the first statements in the first SP, a respective rewritten labeled statement, the second SP via the receiver module. Thereby, the first SP provides the task-ID of the requested computational task and the container-IDs of the first data container to be used, according to the request, as input or output data containers, to the receiver module. The decision module compares the task-ID provided as argument in said call with the IDs of a plurality of second SPs stored in DBMS2 to identify the one of the second SP representing the requested computational task. In addition, the decision module compares the container-IDs provided as argument in said call with the container-IDs assigned to the rewritten statements to provide the second data container names and/or complex rewritten statements to the called second SP at the argument positions indicated by the Container-IDs provided in the call.

The task-ID and container-ID may enable the receiver module to dynamically provide complex rewritten statements derived from statements accessing a view to the second stored procedure as a functional replacement of the call to the first view in the SP1 or in order to create, when executing the second SP, a corresponding second view.

In some embodiments, the rewriting of the obtained statements is executed exclusively by the first DBMS. For example, according to embodiments, a module, e.g. a "linker module", is loaded by the first DBMS. Said module, in combination with the synchronization mapping, may comprise all necessary information (e.g. information on the availability of a second view in the second DBMS which functionally corresponds to the accessed first view and/or information on the availability of a stored procedure in the second DBMS which is a functional analogon to a database-internal or user-defined stored procedure of the first DBMS) required by the first DBMS to resolve a view definition or a reference to a procedure stored only in the first DBMS to statements, views and/or functions available in the second DBMS. This may have the advantage that a communication between the first and the second DBMS for resolving the first statements directed at a view and/or directed at a further stored procedure can be omitted, thereby reducing the computational overhead. In addition, network traffic is reduced in cases where the first and second DBMS are hosted on different servers.

The first stored procedure can be integrated into the first DBMS, for example, by the linker module comprising the first stored procedure. The linker module is configured to communicate with the receiver module and is capable of causing the first DBMS to execute some SQL statements, e.g. for checking privileges of the requesting user or client application in respect to the first tables provided as arguments in the request R. For example, the linker module may cause the first DBMS to execute "SELECT * from table T1 WHERE . . . " in order to test if the client application is permitted to access table T1. In some embodiments, the linker module enables the first DBMS to initiate a communication link with the receiver module and to exchange information, e.g. the rewritten statements and corresponding privilege information, via the communication link.

The one or more second stored procedures may be stored in the second DBMS e.g. by loading, by the second DBMS, a module being specific for a computational task (e.g. k-means clustering) or a set of computational tasks (e.g. a set of different clustering algorithms), whereby each computational task is implemented in the form of a respective second stored procedure. The module may be provided by a particular vendor and the second DBMS may load the task-related modules of multiple vendors. In other implementation variants, the definition of some or all second stored procedures in DBMS2 is stored in the catalogue of the second DBMS.

The data management system may be accessible to a plurality of client applications via a network, e.g. the internet.

In other embodiments, the rewriting of the obtained statements is executed by the first DBMS in interoperation with the second DBMS. For example, the linker module may be provided by the same vendor as the receiver module. The linker module of the first DBMS may comprise or be operatively coupled to a QUERY REWRITE functionality and may be configured to exchange data with the receiver module in order to determine, at runtime, which kind of views and user-defined functions (UDFs) or DBMS-provided stored procedures are available in the second DBMS in order to resolve the first statements into rewritten, statements.

Depending on the embodiment, the receiver module is implemented as an integral part of the second DBMS, as a module that is loaded into the second DBMS, as a plug-in of the second DBMS or as an application program being interoperable with the second DBMS.

The first DBMS, according to preferred embodiments, evaluates the synchronization mapping for dynamically resolving the data container names. It replaces the names of first data containers in each obtained statement by one or more names of the respective second data containers which are mapped to the first data container in the synchronization mapping. However, the synchronization mapping may not comprise sufficient information for allowing resolving first views and/or further stored procedures accessed by a first statement in the first SP, because said view or further stored procedure may not exist in the second DBMS.

According to embodiments, the rewriting each of the first statements comprises:
  determining, by the first DBMS, if the first statement is directed at a view; and
  if the first statements is directed at a view, using, by the first DBMS, a QUERY-REWRITE-function of the first DBMS for identifying the names of the tables in the first DBMS accessed by the view.

In addition or alternatively, according to embodiments, the rewriting of each of the first statements comprises:
  determining, by the first DBMS, if the first statement comprises a call to a further stored procedure implemented by the first DBMS; for example, such a further stored procedure can be an inbuilt stored procedure of the first DBMS or a further stored procedure in the form of a user defined function (UDF) stored in the first DBMS but not in the second DBMS; it can also be a call to an executable program logic available in first DBMS but not in the second DBMS; and
  if the first statements comprises said call, using, by the first DBMS, a QUERY-REWRITE-function of the first DBMS for identifying the names of the tables in the first DBMS accessed by said further stored procedure and for identifying names of a still further stored procedure available in the second DBMS and being capable of performing the same task as the further stored procedure.

Resolving first statements accessing a view, a UDF or other SP (which may be implemented only in the first but not in the second DBMS) via a QUERY-REWRITE-function of the first DBMS may have the advantage that the resolution of the view or the function is executed quicker than approaches using an EXPLAIN functionality of the first or second DBMS. Such EXPLAIN functionalities may have the disadvantage that "explain tables" have to be created in order to store the results of the EXPLAIN function. For each DB user, a plurality of respective explain tables may be created and have to be maintained in one or more different schemas. If data is inserted in such an explain table, it is necessary to clean up the explain tables if they are not required for performing the computational task anymore. In case of crashes, said cleanup may fail and complex explain table deletion routines have to be implemented and executed in order to prevent the accumulation of obsolete data. Using a QUERY-REWRITE function provided already by the first DBMS may have the advantage that no EXPLAIN tables are created in the background, thereby reducing the consumption of computational resources by avoiding the creation, management and deletion of EXPLAIN tables in the first DBMS.

During the query rewrite stage, the QUERY REWRITE FUNCTION transforms SQL and XQuery statements comprising a call to a view or a function into an SQL statement that completely or largely consists of plain SQL statements referencing database tables referenced in a view specification but not the view and comprising functions which are supported by the second DBMS. Rewriting queries is particularly important for very complex queries, including those queries that have many sub-queries or many joins.

For example, the QUERY REWRITE functionality of a first DBMS consisting e.g. of a DB2 for z/OS DBMS is implemented as a step in the preparation/execution phase of any database statement (to be executed in the first or second DBMS). The QUERY REWRITE functionality of DB2 for z/OS applied on a view in DBMS1 is capable of identifying the database tables that will be accessed upon calling said view and to identify the logical query structure of the view specification (not the query plan provided by an optimizer taking into account also physical features of the accessed tables). The QUERY REWRITE functionality is used implicitly e.g. when the first SP prepares or executes a statement via the SQL interface of DBMS1.

According to some embodiments, the QUERY REWRITE functionality of the first DBMS is capable of resolving some functions that may be contained in the view specification. Typically, this requires that the QUERY REWRITE functionality comprises some knowledge of the features of the second DBMS.

For example, the first DBMS could be DB2 for z/OS and could be operatively coupled to a second DBMS consisting of the IBM DB2 Analytics Accelerator based on Netezza. In DB2 for z/OS, the function for computing the base10 logarithm of a given number is named "LOG 10", while in Netezza this function is named "LOG". In this example, the DB2 comprises or can access some information indicating that the equivalent of its LOG 10 function in Netezza is named "LOG". Performing the QUERY REWRITE functionality by the first DBMS may comprise resolving a "LOG 10" function reference to a "LOG" function reference in a view specification or in any other first statement referencing a database function, e.g. a DBMS-internal stored procedure or UDF.

According to some embodiments, the QUERY REWRITE functionality is integrated after the installation and initiation of the first DBMS, e.g. as an installable module, as an additional stored procedure or as a plug-in of the first DBMS. In this case, this "later-added" QUERY REWRITE functionality may comprise information on the capabilities of the second DBMS, e.g. the UDFs contained therein, or may be interoperable with the second DBMS in order to dynamically identify its type and the functions and stored procedures supported by the second DBMS. The "later-added" QUERY REWRITE functionality may use this information during the rewriting-process to provide rewritten statements executable in the context of the second DBMS.

For example, a first statement accessing the view V1 in DBMS1 may be: "SELECT * FROM V". The QUERY REWRITE functionality of the first DBMS may resolve this first statement into the rewritten first statement "SELECT * FROM T1, T2, T3 ". Thus, the rewritten first statement is a logical description of the operations executed on and processing the data of the tables T1, T2 and T3. The physical sequence of joins executed on the first tables T1-T3 in the first DBMS as provided by a respective query planner may not be part of the rewritten statement as the optimal query strategy is determined by the optimizer of DBMS2 later. The QUERY REWRITE statement of the first DBMS automatically extracts all names of first tables accessed by the view V1 and extracts the view specification including the operators, e.g. SELECTS, INTERSECT, UNION or others which specify how the data is processed by the view. By replacing, in a further step that is executed, for example, by a linker module of the first DBMS, the names of the first tables in the extracted view specification by names of second data containers mapped to the extracted first data containers in the synchronization mapping, a rewritten statement is provided that can be executed in the second DBMS and that is functionally equivalent (i.e., will return the same result when applied on the same input data) to the first view. Of course, the replacing of first table names by second table names is executed only in case a particular statement is scheduled to be dispatched to the receiver module.

The same approach may be used for resolving functions in the form of further stored procedures of the first DBMS, e.g. UDFs or DBMS-type specific functions known only to the first DBMS but not to the second DBMS. The first statement comprising a reference to an UDF may be, for example: "SELECT * FROM V1", whereby the view V1 comprises a view specification referencing the UDF AVG ("average"). For example, the view V1 may be defined as "CREATE VIEW V1 AS SELECT AVG(T1.C1), T2.C2 WHERE T1.C2=T2.C2 GROUP BY T2.C2".

The AVG function is, in the above mentioned example, supported by the first DBMS DBMS1, but not by the second DBMS DBMS2. However, DBMS2 supports the functions "COUNT" (counting number of values) and SUM (summarizing values). The tables T1, T2 are first data containers (tables) which are mapped in the synchronization mapping to the second data containers T1', T2' (tables) having the same column names like the first data containers. The QUERY REWRITE functionality of DBMS1 "knows" that DBMS2 supports SUM and COUNT, but not AVG, and does not comprise a second view V1' that functionally corresponds to view V1. The rewritten first statement that can be executed in DBMS2 and which functionally replaces V1 could be: "SELECT SUM (T1'.C1)/(COUNT(T1'.C1), T2'.C2 WHERE T1'.C2=T2'.C2 GROUP BY T2'.C2". Said rewritten statement may either be used to create a view V1' in DBMS2 that functionally corresponds to the first V1 by: "CREATE VIEW V1' AS SELECT SUM(T1'.C1)/(COUNT (T1'.C1), T2'.C2 WHERE T1'.C2=T2'.C2 GROUP BY T2'.C2".

Alternatively, said rewritten statement could be executed when performing the SP2 in DBMS2 whenever the data delivered in DBMS1 by view V1 shall be received in the context of DBMS2.

According to some embodiments, the QUERY REWRITE functionality is not an inbuilt function of DBMS1, but rather a query-rewrite-module that may be loaded into the first DBMS. The query-rewrite-module may be provided, for example, by the same vendor providing a set of one or more second stored procedure. Thus, the query rewrite module may comprise knowledge on the input requirements of the functions and views available in the second DBMS.

According to embodiments, the first DBMS may comprise a linker module that is configured for communicating with the receiver module and optionally also with the query rewrite module of the first DBMS in order to provide information on the availability of views and functions in the second DBMS dynamically.

According to embodiments, the rewriting of a statement into a written statement by the QUERY-REWRITE functionality comprises:
checking privileges of a DB-user via which the request of the client application is received by the data management system on all first data containers accessed by the statement; and/or
resolving all views so that only standard SQL operations and database tables are referenced and accessed in the rewritten statement; and/or
resolving all stored procedures (e.g. a database-specific stored procedure or a user-defined function) accessed by a statement so that only standard SQL operations and database tables are referenced and accessed in the rewritten statement; and/or
replacing all names of first data containers (including the ones accessed via a view specification) by names of second data containers respectively mapped, in the synchronization mapping, to said first data containers; and/or
checking if the second data containers whose names replace the first container names exist in the second DBMS. For example, the QUERY-REWRITE functionality performs a lookup in the synchronization mapping to detect if a particular second table is missing (=not mapped). The synchronization mapping is updated if a second table T1' was removed from DBMS2 and the correspondingly mapped first table T1 still exists in DBMS1. Thus, the QUERY-REWRITE functionality can perform the lookup and can determine that a second container whose name is missing in the synchronization mapping does (probably) not exist in DBMS2.

According to embodiments, the obtained statements comprise one or more second statements. Each second statement may be related to the computational task but is not part of the requested computational task. The second statements are rewritten but not labeled by the first DBMS. The receiver module, in response to receiving of each of the rewritten second statements, determines that the received rewritten second statement is not labeled and uses an SQL interface of the second DBMS for selectively executing the received, non-labeled rewritten statement in the second DBMS.

For example, the second statements may be used for integrating the computational task in a framework for dispatching one or more computational tasks from the first to the second DBMS. The second statements may be used for logging and error-checking purposes, for performing some pre-processing or post-processing steps of the computational tasks within DBMS1 or the like.

According to embodiments, the following statements obtained from the called first stored procedure whose parameter markers have all been assigned a name of a first data container (e.g. a view or database table) hardcoded in the first stored procedure or provided as an argument when calling the first procedure are considered by the first DBMS as first statements:
All statements accessing a view in the first DBMS, e.g. "SELECT * from view V1"
All statements accessing a function implemented in the first DBMS, e.g. "SELECT AVG(T1.C1), T2.C2 WHERE T1.C2=T2.C2" or "SELECT myFunction (T1.C1, T2.C2, T3.C3) UNION T5.C1".

All other statements in the first stored procedure obtained from the called first stored procedure may be considered as second stored procedure. For example, the first stored procedure may comprise a call to the second stored procedure and later in the code of the first procedure may comprise a statement that specifies a post-processing step of the result set returned by the called second stored procedure. The post processing may be used for docketing purposes, for storing the result set also in the first DBMS and/or for formatting the result set or linking it to functionalities of a task dispatching framework implemented by the data management system.

According to some embodiments, the called first stored procedure comprises one first statement for each name of a data container in the first DBMS provided, according to the code specification of the first stored procedure, as argument to the second stored procedure being called within said code specification. For example, such first statements could comprise a statement like "SELECT * from tableTX" for each first database table TX whose name is provided as argument to the second stored procedure upon the first SP calling the second SP. Thus, the first statements may be directed at tables or views of the first DBMS. The first DBMS, e.g. the linker module, will label said first statements and will assign, after having resolved the first table name to a respective mapped second table name, the task ID of the requested computational task and the container ID of the mapped second table to the rewritten first labeled statement. Said labeled rewritten statement are not executed in the second DBMS but rather are used by a procedure execution module of the receiver module to provide the name of said second table as argument to the second SP.

According to embodiments, the method comprises providing a first and a second data storage location, the first and second data storage location being writable by the first DBMS and being at least readable by the receiver module. The selective labeling comprises:

selectively storing, by the first DBMS, all obtained rewritten statements being derived from a first statement in a first data storage location; and selectively storing, by the first DBMS, all obtained rewritten statements not being derived from a first statement in a second data storage location.

Labeling the first rewritten statements by storing them in a different storage space location than non-labeled rewritten statements may have the advantage that the receiver module may receive the labeled and non-labeled statements in the form of pointers to respective storage areas and may use the location information to determine if a rewritten statement shall be considered and processed as labeled or non-labeled rewritten statement. This may increase performance as no time-consuming parsing of the individual statements and their labels by the receiver module is necessary.

According to other embodiments, the selective labeling comprises selectively storing, by the first DBMS, for each obtained rewritten statement which is derived from a first statement, an environment variable in the register of the second DBMS, the environment variable indicating that the obtained rewritten statement is a labeled statement.

Labeling the first statements by setting an environment variable in a register may have the advantage that the receiver module may evaluate, upon receiving each of the obtained rewritten statements, the environment variable and operate in two different modes: in one mode used in case the environment variable indicates that the rewritten statement is labeled, the receiver module evaluates the task- and container-IDs in order to provide second data container names and rewritten statements being functionally equivalent to views and functions of the first DBMS to the second stored procedure. In another mode used in case the environment variable indicates that the rewritten statement is not labeled, the receiver module executes said statement in the second DBMS via a standard SQL interface of the second DBMS. This may increase performance as no time-consuming parsing of the individual statements and their labels by the receiver module is necessary. Moreover, this approach may have the advantage that registers (a data structure provided already by many state-of-the art DBMS) can be easily used for determining the operation mode of the receiver module. Thus, the receiver module may take advantage of existing, speed-optimized facilities of the second DBMS2.

For example, the first DBMS defines a new or existing special register and stores a data value to be used as an environment variable for the mode of evaluating and processing the rewritten labeled statement by the receiver module in that special register. The receiving module decides if the labeled rewritten statement is immediately processed in the second DBMS via a standard SQL interface or is used for returning a result set and providing second container names and/or rewritten statements being functionally equivalent to views and functions of the first DBMS to the second stored procedure. In the case of using IBM DB2 analytics accelerator (IDAA), the environment parameter "Netezza optimizer hints" (which are the Netezza-specific special register values) can be used for setting the environmental parameter values. An example for a first statement directed at a DB2 database used as the first DBMS which is labeled by means of a special register parameter value and forwarded to the receiver module is:

```
WITH DSN_INLINE_OPT_HINT(HINT_TYPE, OPT_PARAM)
AS (VALUES ('ACCEL',
'IDAA_QUERY_RETURNS_SQL_STATEMENT_TEXT_ONLY
(<task-ID/container-ID)')) SELECT * FROM VIEW;
```

According to other embodiments, the selective labeling comprises adding, by the first DBMS, a prefix, infix or suffix selectively to all obtained rewritten statements being derived from a first statement. "Derived from a first statement" as used herein means "created by rewriting a first stored procedure". Labeling the first statements by using a special query argument may have the advantage that this approach also works in case the second DBMS lacks a suitable register and in case the use of two different storage locations cannot be implemented easily. The prefix, infix or suffix-based approach does not require special data storage locations or registers and thus can be implemented in almost any kind of DBMS.

For example, in case no special register is available, the first DBMS is a further argument in the form of a special prefix, infix or suffix, to the obtained first statement. This may be performed before or after the rewriting step. The first statement "SELECT * FROM V1" may be labeled by an additional SQL expression according to:" "SELECT * FROM V1 JOIN idea_explain_trigger_table" or "SELECT 'IDAA_EXPLAIN_MODE' * FROM V1 JOIN idea_explain_trigger_table".

In some cases, interference of the additional arguments of the rewritten statement have been observed to interfere with the DBMS1 query optimizers which may automatically remove infixes considered as unused Join arguments. In addition, the receiver module has to remove the prefix/infix/suffix for obtaining the actually intended statement text. Therefore, this approach is often not as efficient as the register-based approach, because each statement has to be parsed and optionally modified both for adding the label by the first DBMS and for removing the label by the receiver module.

According to embodiments, the receiver module extracts the task-ID and the container-ID from each received labeled statement for identifying the second stored procedure implementing the requested computational task and for providing the received and rewritten first statements comprising the resolved second data container names to corresponding arguments of the identified second stored procedure.

This may have the advantage that each labeled statement can clearly be assigned to a particular second stored procedure and to a particular parameter marker for a first data container. For example, the task-ID may be used for identifying, by the receiver module, a particular second stored procedure implementing the requested computational task and the container-ID may be used by the receiver module the name of a table or view to be used, according to the request and according to the arguments provided when calling the second SP, as input or output data containers for providing the respectively obtained second data container name or resolved view or UDF-statement to the second SP.

According to embodiments, the assigning of the task-ID and the container-ID to a rewritten first statement comprises storing the task-ID and the container-ID in a data storage location in association with the rewritten first statement, the data storage location being writable by the first DBMS and being at least readable by the receiver module.

According to further embodiments, the assigning of the task-ID and the container-ID to a rewritten first statement comprises storing the task-ID and the container-ID in a register of the second DBMS in association with the rewritten first statement, the register in addition comprising environment variables of the second DBMS and of the receiver module.

According to embodiments, the assigning of the task-ID and the container-ID to a rewritten first statement comprises adding, by the first DBMS, a prefix, infix or suffix each obtained rewritten first statement.

The benefits of the different ways of storing and communicating the task-ID and container-ID correspond to the benefits of the respective approaches for labeling rewritten statements as described above.

According to embodiments, the returning of the result set for the rewritten statement derived from the first statement directed at the first view comprises returning, by the receiver module, a result set with null data records, the structure of the result set being identical to the structure of the first view.

Returning an empty result set may have the advantage that the first DBMS is informed that the rewritten first labeled statement was successfully received by the second DBMS. This may allow the first DMBS to keep control on the overall task execution, e.g. for the purposes of logging and data container synchronization.

The receiving of a corresponding result set at least for each rewritten labeled first statement accessing a view or accessing a further stored procedure stored in DBMS1 may be advantageous as this information enables the first stored procedure to call the second stored procedure only in case a respective result set was obtained for each first statement of the first stored procedure comprising a reference to a "complicated" entity such as a view or a stored procedure that cannot be resolved merely based on the information contained in the synchronization mapping.

In some embodiments, the first stored procedure calls the second stored procedure only in case a respective result set was received by the first DBMS for each first statement of the first stored procedure (comprising a reference to a first table or to a "complicated" entity such as a view or a stored procedure). Thus, the triggering of the second SP in case the second DBMS did not receive a respective rewritten statement for each first statement in the first SP can be prohibited (which is beneficial as in this case the requested computational task could not be executed in the second DBMS anyway).

According to embodiments, the first DBMS performs, for each rewritten labeled statement, a test if all second data containers (tables and views) referenced in said statement exist in the second DBMS and if the DB-user of the second DBMS to be used for performing the second SP has the necessary permissions to access said second data containers. The rewritten and labeled statement is transmitted from the first DBMS to the receiver module. In case a second data container referenced in the rewritten labeled statement does not exist, the receiver module triggers the creation of said second data container in the second DBMS.

According to embodiments, the receiver module notifies the first DBMS, for each received rewritten and labeled statement (and optionally also for the received non-labeled statements) that said rewritten statement was successfully received. A successful receipt may comprise, for example, a checking if the rewritten statement can be parsed and executed in the second DBMS. This notification is implemented, for example, in the form of a result set returned by the receiver module for each received labeled (and optionally also non-labeled) statement.

According to embodiments, the notifying of the first DBMS that the receiver module received the rewritten labeled statement derived from the first statement directed at the first view comprises returning an empty result set whose structure is identical to the structure of the first view. This may be advantageous as this structure is the structure that is expected by the first DBMS having dispatched the first statement directed at the first view for execution to the second DBMS. Thus, the standard SQL interface of the first DBMS may be used for receiving the notification (i.e., the result set). However, the empty result set does not comprise the rewritten and labeled first statement.

According to embodiments, the notifying of the first DBMS that the receiver module received the rewritten labeled statement derived from the first statement directed at the first view comprises:
  chunking the rewritten first statement into one or more chunks being as large or smaller than a predefined maximum length;
  creating the result set comprising at least a first column and a second column, the second column having the predefined maximum length; and
  filling the second column with the chunks and filling the first column with sequence numbers of the respective chunks. For example, the first column can be created as VARCHAR(MAXLENGTH) and the second column can be of type INT.

Using the above described result set structure may be advantageous as also very large rewritten first statements, which may be derived from first views comprising a very complex view specification and a huge number of input and/or output tables may be returned to the first DBMS even in case none of the columns and column-data types of the first view supports a result set with a sufficiently large VARCHAR column.

Receiving a result set comprising the rewritten labeled statement for each first statement in the first stored procedure directed at a view or a stored procedure in the first DBMS may ease the logging and documenting of the workflow by the first DBMS. Returning the rewritten query string may be advantageous especially for rewritten first statements specifying that and how a second view is to be created in DBMS2 or specifying the name of an additional second data container to be created in DBMS2 for storing intermediate results. By informing the first DBMS of the "output table names" and view names of tables and views that will be generated in DBMS2 allows checking the names of the to-be-created tables and views to comply with naming conventions and to be synchronized with respective data containers of the first DBMS. In case additional tables have to be created in the second DBMS (e.g. temporary tables for storing intermediate data), the DBMS1 may register the soon-to-be-created names of said additional second tables in the first catalog and synchronize table names in both catalogs.

According to embodiments, the notifying of the first DBMS that the receiver module received the rewritten labeled statement derived from the first statement directed at the first view comprises creating a result set comprising at least a column of CLOB type ("character large object" type); filling the column with the rewritten statement; and using the result set with the filled column for returning it to the first DBMS. In some embodiments, the CLOB may in addition be chunked as described above. Using a CLOB type may be advantageous as CLOBS have a much higher size limit (e.g. 2 GByte) than Varchar types.

Returning the rewritten labeled statement via a result set of the above described structures has the advantage that the statements can be returned to the first DBMS even in case the structure of the first view does not support a data type of sufficient size. However, said approaches require the first DBMS to be of a DBMS type that accepts result sets whose structure does not exactly correspond to the structure of the data container (view V1) the original statement was directed at.

According to embodiments, the receiver module automatically creates a second view in the second DBMS. The specification of the second view consists of the rewritten first statement derived from the first statement directed at the first view. The second stored procedure uses, upon being called, the created second view for the reading of the input data.

Creating the second view in the second DBMS may be advantageous as the created second view V1' may provide, in the second DBMS, a functional analogon to the first view of the first DBMS, thereby enabling the second stored procedure to retrieve input data in a particular data processing step in basically the same or a very similar way as when calling the first view V1 in DBMS1.

According to embodiments, the synchronization mapping is updated after the creation of the second view in the second DBMS, thereby mapping the second view to the first view in the first DBMS. In the following, the rewriting of statements may comprise replacing the name of the first view V1 in each obtained first statement by the name of the second view V1 '. This may reduce the size of the rewritten statements accessing views and thus may reduce data traffic and increase performance.

According to embodiments, the data management system is configured for processing multiple requests of respective client application concurrently. For example, session IDs or other means for providing a request execution context may be used for ensuring that the first statements derived from the first stored procedure called by a particular request are selectively used for identifying the second data container names and rewritten first statements to be provided as arguments to the called second stored procedure when executing the requested computational task in the second DBMS.

According to embodiments, the second DBMS lacks an interface for receiving requests from client applications and wherein the first DBMS receives the request of the client application via an interface that is also used as interface of the data management system.

Thus, the data management system may appear to each client to be a single, monolithic DBMS, whereby only a single SQL interface is presented to a client application, which is identical to or used as the SQL interface of the first DBMS. The fact that this "single" DBMS in fact comprises a first DBMS and one or more second DBMSs "under the hood" to increase query processing performance may be completely transparent to the client. For example, the data management system may be provided as a single executable (and in some cases also installable) file.

According to embodiments, the first DBMS determines, for each of the first data containers whose name is specified in one of the obtained rewritten statements, if the client application has all necessary privileges to access said first data container. Only in case the client system has all necessary privileges to access all identified first data containers, the first DBMS performs the rewriting of the obtained statement. In case the client application lacks one or more necessary privileges to access all first data containers specified in any of the obtained statements, the first DBMS terminates the method. Performing a privilege check by the first DBMS may be advantageous as this may ensure that the request does not access confidential or other data the client is not allowed to see.

According to embodiments, the first data containers comprise both database tables and views, wherein at least at the moment of receiving the request only the first data containers which are database tables are synchronized with the second DBMS and are mapped via the synchronization-mapping to one or more of the second data containers. In some embodiments, after second views were created in the second DBMS which are functionally identical to respective first views, the synchronization mapping may be updated automatically, e.g. by the receiver module, to comprise also a mapping of the first views with respectively created second views.

According to embodiments, the receiver module comprises a decision module and a procedure execution module. The decision module is configured for evaluating the received rewritten queries and for executing each non-labeled rewritten statement in the second DBMS via a standard SQL interface of the second DBMS. In addition, the decision module is configures for returning a result set to the first DBMS for each rewritten labeled statement instead of executing the rewritten first statements via said standard SQL interface. In embodiments, the receiver module may also return a result set for other rewritten but non-labeled statements.

Upon having determined that a received rewritten statement is labeled, the decision module transfers each rewritten and labeled first statement and its assigned task-ID and container-ID to the procedure execution module. The procedure execution module identifies the second stored procedure assigned to the requested computational task via the task-ID and identifies first input and output data containers assigned to said rewritten labeled statement via the container-ID assigned to said statement. The procedure execution module provides the rewritten statement derived from the first statement directed at the first view to the identified second stored procedure, thereby providing a resolved first view specification interpretable by the second DBMS and the names of the second data tables (mapped to said first input and output containers) to be accessed when performing the resolved view definition for enabling the second stored procedure to perform the requested computational task.

Figure 3:
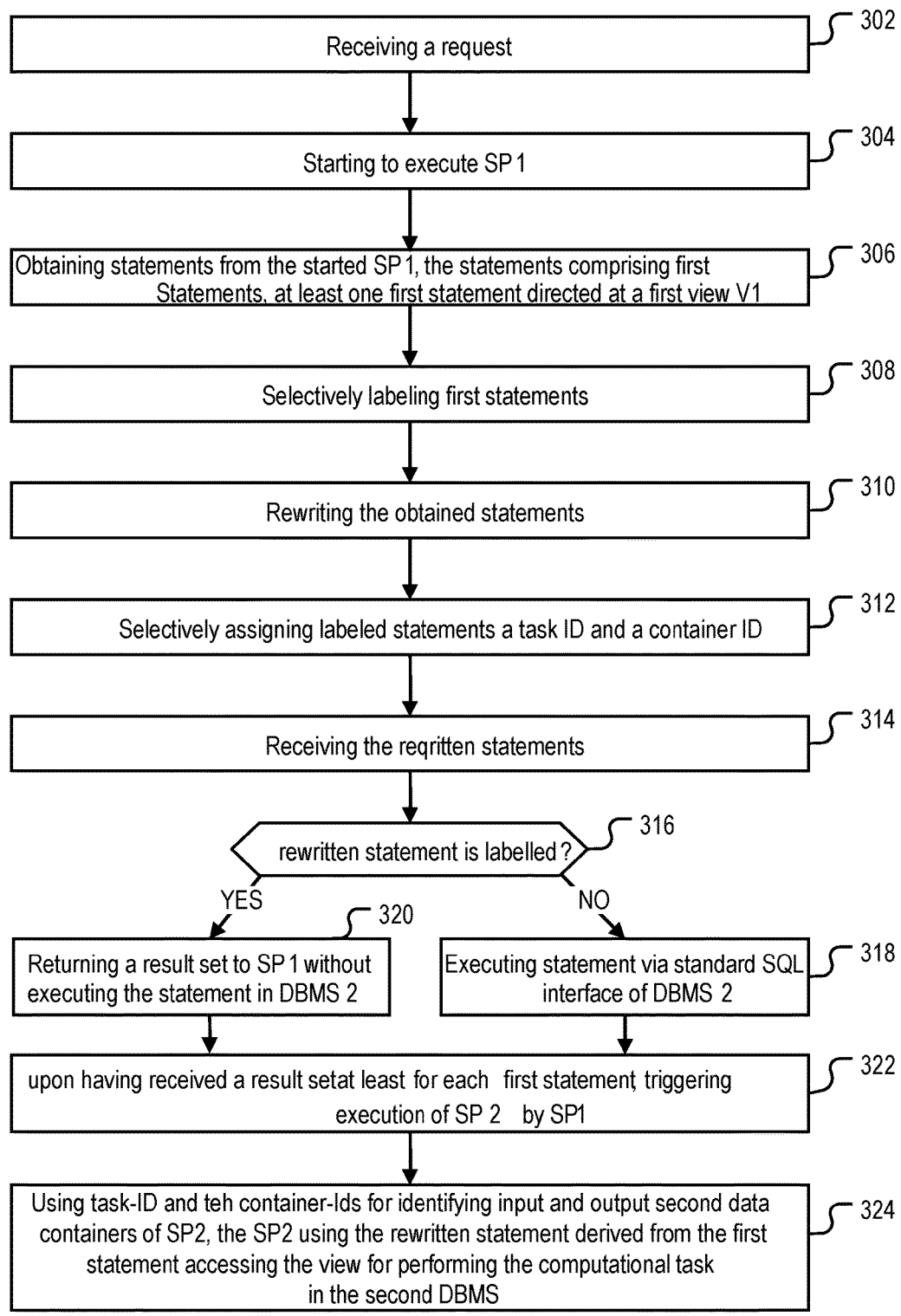
FIG. 3 depicts a process flow according to an embodiment.

FIG. 1 depicts a data management system 102 comprising a synchronization mapping 138, a first DBMS 110 and at least one second DBMS 128. The system 102 and its components may be configured for executing a method according to embodiments herein as depicted, for example, in FIG. 3. The system 102 may comprise a one or more processors 104 for performing instructions which encode the method for secure stored procedure execution according to embodiments herein. The instructions may be stored in a memory 108 of the system and/or in a non-volatile storage medium 106.

The synchronization mapping can be implemented, for example, as a database table, a configuration file or a service operatively coupled to the data management system 102. It may comprise a 1:1 assignment of first and second data containers. For example, first table T1 is mapped to second table T1', first table T2 is mapped to second table T2', and so on. The mapping indicates that the data content in a first table is completely or partially copied to the respectively mapped second table, e.g. by a regularly executed synchronization or data replication process. However, for some embodiments, the mapping of first tables to second tables may be a 1:n or an n:1 relationship. In some embodiments, the synchronization mapping is part of the first catalogue 112. In other embodiments, the synchronization mapping may be part of the second DBMS or may be external to both DBMS but operatively coupled to both the first and the second DBMS e.g. via a network connection.

According to some embodiments, the synchronization mapping is contained in the database catalogue 112 of the first DBMS. The data synchronization is indicated in FIG. 1 by dotted arrows. The first and/or the second system may comprise unmapped tables T4, T5', T6'. According to some embodiments, the first DBMS and the second DBMS and/or a receiver module operatively coupled to the second DBMS have access to the synchronization mapping 138. In other embodiments, the content of the synchronization mapping is completely or partially copied and the second DBMS and/or the receiver module have access to said copy. The copy may be regularly synchronized with the original synchronization mapping.

The second DBMS comprises a second database with a plurality of second tables T1'-T3', T5', T6', a second user management module 140 for managing and checking privileges of DB-users of the second DBMS, and at least one second stored procedure 116, the second stored procedure configured for performing the computational task in the second DBMS. The synchronization-mapping comprises a mapping at least some of the first tables to respective ones of the second tables, the system being configured for transferring data of at least some of the first tables to respective ones of the second tables in accordance with the synchronization-mapping.

Figure 2:
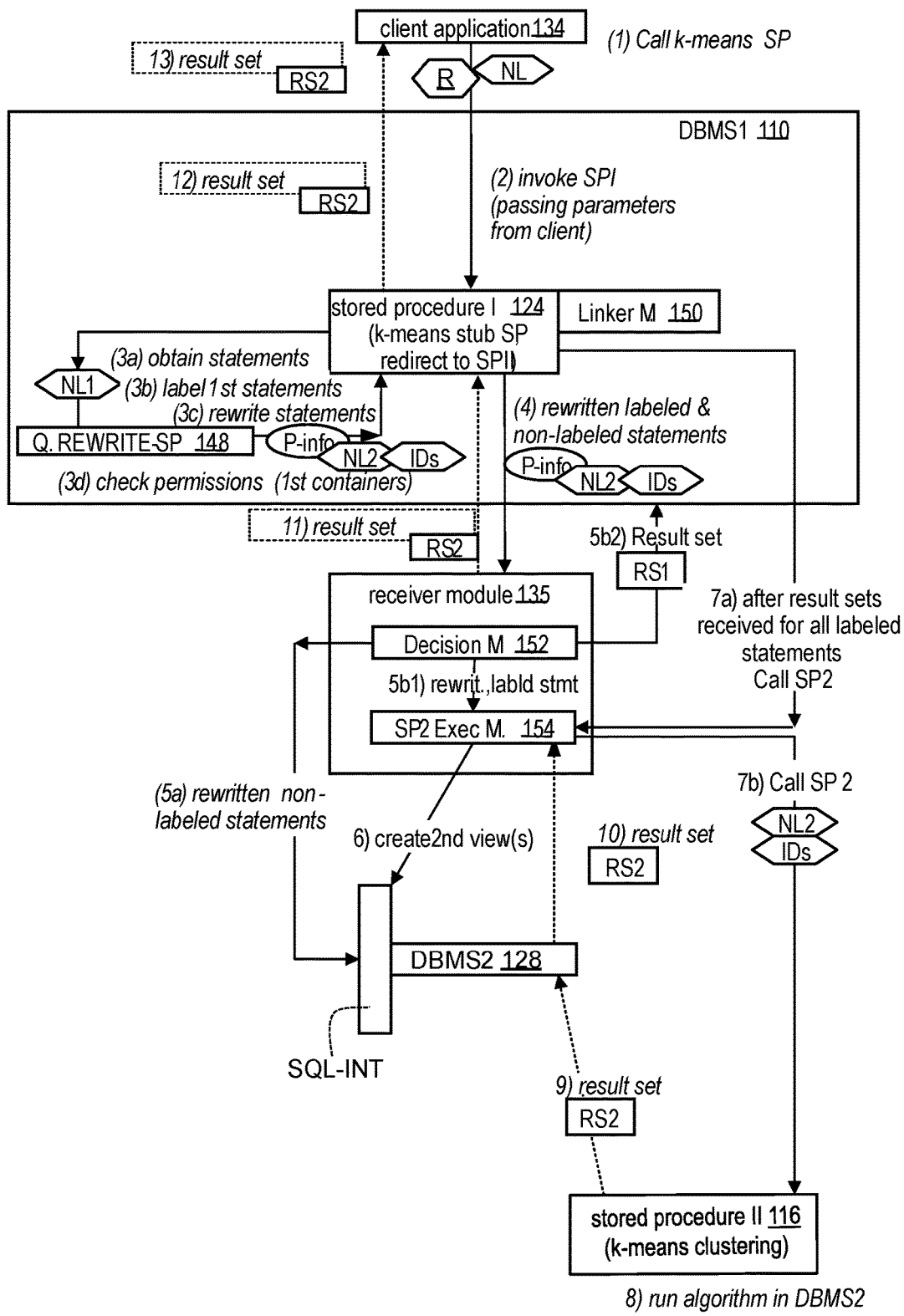
FIG. 2 depicts a processing schematic according to another embodiment.

The system can be implemented according to various embodiments described herein and can, accordingly, be configured for performing the method depicted in FIGS. 2 and/or 3.

The system 102 may comprise a first DBMS, e.g. DB2, and a second DBMS, e.g. an analytics accelerator such as Netezza. The system 102 may also comprise multiple second DBMS. Depending on the embodiment, the first and the second DBMS may be hosted on the same data processing device or may be hosted on different data processing devices connected to each other via a network connection. The second DBMS may be operatively coupled to a receiver module 135. The receiver module may be an integral part of the second DBMS, a module loaded into the second DBMS at runtime of the second DBMS, a plugin or a separate application program being interoperable with the first DBMS. The receiver module is used for managing, in interoperation with a linker module of the first DBMS and with the second DBMS, the execution of a requested computational task to the second DBMS. It may comprise one or more first stored procedures 124 dynamically or permanently assigned to a computational task, e.g. a k-means clustering.

The first DBMS may comprise a plurality of first SPs, e.g. stub SPs for k-means clustering, naïve Bayesian clustering, and or for any other kind of data processing task. Each of said first SPs 124 may be published in the context of DBMS1 by means of a data definition language, e.g. CREATE PROC KMEANS (IN PARAMETERS VARCHAR (23K), . . . ) EXTERNAL NAME <gencode-ID>). Thereby, the <gencode-ID> tag is identical in all first SPs 124 and identifies a generic code snippet used e.g. for providing first statements. The first statements have the function of providing, after being resolved to respective names and data structures available in the second DBMS, all required information to the second DBMS for enabling a second SP mapped to the called first SP to perform the requested computational task, e.g. k-means clustering, in DBMS2. The assignment of a called first SP to a respective one of a plurality of second SPs in DBMS2 may be predefined or may be determined after having called the first SP. In addition, each first SP comprises a call to a respective one 116 of the second SPs in DBMS2. For example, the request R may comprise a plurality of first data container names to be used as input or output data containers when performing the computational task in the context of DBMS2. Said first container names are provided as arguments to one of the first SPs and the called first SP provides all or at least some of said first data container names as arguments when calling the second SP.

According to embodiments, the first DBMS is configured to obtain, when the first SP is called, a plurality of first statements from the first SP, the first statements having declarative functions. This means that the first statements are not used according to embodiments herein for dispatching them to a standard SQL interface of the second DBMS for execution but rather for resolving features of first data to allow performing the requested computational task by the second SP in the second DBMS. The resolution of features may comprise obtaining names of first and respectively mapped second data containers and columns and/or comprise resolving references to views or functions only contained in the first DBMS to SQL statements which can be interpreted and executed by the second DBMS. The static or dynamic mapping of first and respective second SP may be specified in a metadata catalogue loaded into the first or second DBMS. In addition, each first SP may comprise second statements for logging or tracing purposes or for integrating the task dispatching functionality in a framework loaded into the data management system. A second statement thus is typically not contributing directly to the result of a computational task.

The first database tables T1, T2, T3 of DBMS1 are mapped to respective second database Tables T1', T2', T3' in the synchronization mapping 138. This implies that data from T1 is transferred to T1', from T2 to T2' and so on. At the moment of receiving a request R from a client application 134, the first DBMS1 comprises a view V1 whose name is—among other first data container names—specified in a name list NL specified in the request. The name list NL is provided as input to SP1 124. However, the DBMS2 lacks a functional and structural equivalent view.

According to some embodiments, the synchronization between the first and the second DBMS process is performed on a regular basis, e.g. once in an hour or one in a day. In addition, or alternatively, the synchronization process may be triggered by automatically thrown events or in response to a user-action. A user may specify e.g. in a configuration file when and what kind of data of the first DBMS is transferred to the second DBMS. According to some embodiments, the first and the second DBMS respectively comprises an agent involved in a replication process: a source agent of the first DBMS may capture changes of the data in the first data containers (i.e., in the first DBMS) and transfers the captured changes to an apply agent of the second DBMS. According to embodiments, the synchronization table is stored in the first catalogue. In some embodiments, the synchronization process is controlled by a component of the first DBMS.

In the data management system according to embodiments herein, the data content of some or all of the first data containers is once or regularly copied to one or more second data containers of the second DBMS. The copying may be implemented in the form of a replication process that is regularly executed, in the form of bulk operations like IDAA's ACCEL_LOAD_TABLES SP or by other data synchronization and copying means. The first and second tables may have different names, e.g. two limitations of the naming conventions.

The linker module 150 has the function of enabling an arbitrary, conventional DBMS to communicate with a receiver module 135 for automatically dispatching the execution of a requested computational task on DBMS2 rather than DBMS1. The receiver module, if provided as a separate application program, plugin or module and not as an integral part of DBMS2, may also have the function of communicating with the first DBMS and to provide a communication link between the first and the second DBMS.

Each DBMS may comprise its own metadata catalogue 112, 130 comprising information on the structure of first or second data containers and may comprise its own query optimizer 114 for planning and optimizing database queries. The receiver module 135 comprises, according to embodiments, a decision module 152 for determining if rewritten statements obtained from the first DBMS are labeled or not. If a statement is not labeled, it is forwarded to a standard SQL interface of DBMS2 for immediate execution. For example, this may be use to immediately perform second statements obtained from SP1 124 used for logging, framework integration and other purposes. If a statement is labeled, it is forwarded to the procedure execution module 154 where a result set RS1 is generated and returned for each received labeled statement in case all second data containers to be accessed by said statement exist in DBMS2 and in case the DB-user to be used for accessing said containers has all necessary privileges. Otherwise, no result set or an error message is returned. At least in case the labeled rewritten statement was derived by resolving an original first statement directed at a view V1, the result set comprises, in some embodiments, the rewritten statement which functionally corresponds to the view specification of the first view V1 and can be executed in DBMS2, e.g. for creating a corresponding second view V1'.

In case the label is implemented as an infix, prefix or suffix of the statement, the module 154 removes said label. In addition, the procedure execution module evaluates the task-ID and container-ID of each rewritten labeled statement to identify to which second stored procedure and respective task the rewritten statement belongs and a container-ID to identify the argument and its position of said second SP 116 to which a second data container name contained in the rewritten labeled statement shall be assigned. In case the rewritten labeled statement was derived from a first statement accessing a first view or a function contained in DBMS1, the whole rewritten first statement, e.g. a statement for creating a functionally equivalent second view in DBMS2 may be used as an argument and input to the called second SP 116, not only the name of a second data container. Such a rewritten statement generated for a statement accessing a view or a stored procedure in DBMS1 may comprise names of multiple second data containers and/or may comprise a reference to stored procedures (e.g. UDFs or stored procedures provided by the DBMS2) of DBMS2.

FIG. 2 depicts a processing schematic of the computer implemented method for performing a computational task according to an embodiment. Said embodiment can be described by making reference also to a process flow depicted in FIG. 3.

In a first step (not shown), one or more first stored procedures 124 are stored in the first DBMS, and a corresponding set of second stored procedures which respectively implement a computational task is stored in the second DBMS. A metadata catalogue (not shown) of DBMS1 or DBMS2 may comprise assignment information for assigning first stored procedures to respective second stored procedures.

In some embodiments, each of the first stored procedure basically comprises some second statements e.g. for logging and framework integration and a plurality of first statements for declarative purposes, e.g., for triggering the resolution of first data container names and functions to corresponding data container names and functions in the second DBMS, and a call to a respectively assigned second SP. It is possible that the first SP is highly generic and comprises code sections, e.g. for the declarative part, which is basically the same in all first procedures.

The first statements in a first SP 124 can be specified as complete or incomplete statements. For example, the first statement may be directed at a first data container hardcoded in the first stored procedure ("SELECT * from table T1") or may be directed at a parameter marker that is dynamically filled with a first container name provided as an argument by the request for the computational task ("SELECT * from <argument3>").

In still other embodiments, all statements to be considered as first statements (having mainly a declarative/name resolving function) may be discerned from other, second statements by specifying all first statements in a special, declarative section of the first SP or by means of marking said statements as first statements already in the first SP. Thus, a plurality of implementation variants exist for indicating and/or identifying, by the first DBMS, first statements which are to be labeled and to be assigned a task ID and a container ID of a respectively mapped first container for enabling the second SP to be executed in the second DBMS.

In step 302, the first DBMS receives a request R for performing a computational task, e.g. k-means clustering.

The request is received from a client application 134, e.g. a program logic running on a desktop computer, a notebook, a mobile phone or other data processing device.

The request may comprise names NL of a plurality of first tables and views to act as input or output tables for performing the computational task (and thus comprises first table names of the first DBMS that comprise the relevant input data or that should be used as containers for storing intermediate and final results). Upon the receipt of the request, the first stored procedure is called, whereby the first table and view names NL of the request are provided as arguments to the first stored procedure.

The first stored procedure may be a stored procedure specific for the requested computational task and may be specifically assigned to a specific, individual computational task. Alternatively, the first stored procedure may be a stub stored procedure that is assigned dynamically with any of a plurality of computational tasks supported by the data management system upon receiving the request. Thus, said first stored procedure may be assigned to the requested computational task and a corresponding second SP dynamically at the moment of receiving the request.

The first procedure comprises a plurality of first statement having the main purpose to identify statements and first container names and references to elements of the first DBMS which shall be resolved into second data container names and rewritten statements interpretable by the second DBMS.

In response to the receiving of the request, the first SP is executed, thereby using at least some parameter values NL provided by the request of the client application as input arguments to the called first SP. The provided parameter values indicate which ones of the first data containers are to be used as input or output data containers for performing the requested computational task.

At least after having provided first data container names NL to the first SP, at least one of the first statements comprises a name of a view V1 of the first DBMS. In addition, said or other first statements may call a further stored procedure implemented in the first DBMS, e.g. a UDF ("myFunction( )") or a DBMS-specific function (e.g. "AVG") that may not be supported by the type of DBMS used as the second DBMS.

The first DBMS may then automatically decide to execute the requested computational task in the second DBMS. However, as the parameter list NL of the client application comprises first data containers names and optionally references to further stored procedures supported only by the first DBMS, simply forwarding the request to the second DBMs would not allow executing the requested computational task on the input data specified in the request in DBMS2.

In step 304, the called first SP starts to execute and the first DBMS obtains in step 306 first and second statements directed at one or more database tables contained in the first DBMS. At least one of the obtained first statements is directed at a first data container which is a first view. It is also possible that one or more of the first statements access a stored procedure stored only in the first DBMS, e.g. a UDF or a stored procedure already supported by the type of DBMS uses as the first DBMS. For example, some DBMS types may support the function "AVG" for "calculating an average".

The first DBMS evaluates the synchronization mapping for identifying one or more second tables mapped to the names NL1 any one of the first data containers the obtained statements are directed at. This information may be used in the statement rewriting step for replacing names of first data container by names of respectively mapped second data containers. The first container name list NL1 may be identical to the list of first data container names NL provided by the client in the request R or may comprise additional first data container names hard-coded in SP1.

In step 308, the first DBMS selectively labels the ones of the obtained statements which are first statements. Depending on the embodiment, the labeling may be performed before or after the obtained statements are rewritten. The labeling can be performed e.g. by storing labeled and non-labeled rewritten statements in different storage space locations, by setting an environment variable in a register of the second DBMS for each labeled statement allowing the receiver module to process labeled statements in a different processing mode than non-labeled statements. It is also possible that the label is integrated into each first statement in the form of a suffix, prefix or infix SQL expression.

The first DBMS rewrites each of the obtained statements (irrespective of whether they are first or second statements and if they are labeled or not). For example, the rewriting can be performed by a QUERY REWRITE functionality 160 being an integral part of the first DBMS. In some embodiments, the QUERY REWRITE functionality is only initiated for first statements directed at a view or stored procedure of the first DBMS as the first statements consisting of standard SQL directed at a first database table can easily be transformed into a rewritten first statement executable in the second DBMS by replacing the first table names with respectively mapped second table names according to the synchronization mapping.

Using such inbuilt QUERY REWRITE functionality may have the advantage that complex view specifications and in some cases even some stored functions implemented in the first but not in the second DBMS can be resolved to a standard SQL statement which may be complex but can be interpreted by any DBMS capable of interpreting standard SQL syntax. In addition, contrary to EXPLAIN functionalities provided by some DBMS which could do a similar job, not additional EXPLAIN tables have to be created, maintained and deleted afterwards, so the rewriting of the statements can be performed at comparatively low computational costs.

According to some embodiments in which the first DBMS lacks an inbuilt QUERY REWRITE functionality, it is also possible to install and use a QUERY REWRITE functionality installed in the first DBMS in the form of a QUERY REWRITE stored procedure or QUERY REWRITE module. Thus, the QUERY REWRITE SP or module "knows" the capabilities and requirements of the second DBMS (e.g. the UDFs and SPs stored in the second DBMS). Thus, said QUERY REWRITE SP or module may act as a generic engine for rewriting any kind of first statements comprising a reference to a view of stored procedure of the first DBMS.

The rewriting process 310 comprises replacing names of first data container by names NL2 of respectively mapped second data containers. The replacement step may be performed by the QUERY REWRITE functionality or the QUERY REWRITE SP or module or by an additional module or functionality being an integral part of or an add-on function of the first DBMS.

Rewriting statements which access a view are particularly advantageous, because a corresponding view may not exist in the second DBMS or the view definition of the first view may not be applicable in the context of the second DBMS because the table names, UDFs contained in the view definition or the logical interconnectivity of the tables accessed by a view may differ in the first and the second DBMS. After the rewriting of a first or second statement has completed, said rewritten statement is expected to be executable in the second DBMS.

In step 312, the first DBMS assigns a task-ID of the requested computational task and a container-ID of the one of the first data containers at which the first statement from which the rewritten statement was derived was directed at. The task-ID and container IDs are assigned to any first statement irrespective if they access a view or call an UDF or not. The assigned IDs have the function of enabling the receiver module to assign the rewritten first statement to a second SP implementing the requested task and to provide the name of the second data container at the appropriate argument position expected by the second SP.

In case the rewritten first statement was derived from a first statement accessing a view or a stored procedure of the DBMS1, the container-ID is used for providing the (complex) rewritten first statement which functionally corresponds to the first statement accessing the view or stored procedure in the DBMS1 at the appropriate argument position expected by the second SP.

In addition to the rewriting of the statements, the first DBMS may check if the DB-user via which the request R is received is allowed to access the first data containers specified in the request. Only in case the DB-user has the necessary privileges and was successfully rewritten, a first or second rewritten statement is forwarded from the first DBMS to the receiver module 135.

Then, the receiver module receives the rewritten and labeled first statements. This is depicted by step 314 which is executed for each of the obtained and rewritten first and second statements. At least one of the received rewritten statements is derived from the first statement accessing a view.

In step 316, the decision module 152 of the receiver module 135 determines if the received rewritten statement is labeled or not. In case the received rewritten statement is not labeled, the decision module immediately executes in step 318 the received non-labeled rewritten statement in the second DBMS via a standard SQL interface 156 of the second DBMS. In case the received rewritten statement is labeled, the decision module checks if the received labeled statement can be executed in DBMS2 (e.g. by checking if all addressed second data containers exist or can be created and if the DB-user to perform the second SP implementing the requested computational task has the necessary privileges to access the second data container(s) specified in the received labeled first statement. If the checking indicates that the received labeled statement can be executed in the DBMS2, the decision module 152 returns a result set RS1 to the first DBMS in step 320 and forwards said rewritten labeled first statement to the procedure execution module 154.

The result set RS1 is returned for each rewritten labeled statement. Thus, it is returned for each rewritten labeled statements derived from "simple" first statements only accessing a first database table as well as for each rewritten labeled statement derived from a first statement accessing a complex element, e.g. a first view V1 or a stored procedure (UDF, DBMS-internal SP) of the first DBMS. It is possible, according to embodiments, that the receiver module also returns a result set for each received non-labeled statements and that the first DBMS in addition evaluates if result sets for those non-labeled rewritten statements were received before the first SP triggers execution of the second SP. However, the receiving of at least a respective result set for each rewritten and labeled statement sent to the receiver module constitutes, according to embodiments, a kind of minimum requirement that has to be fulfilled for triggering execution of SP2.

The result set returned for a rewritten labeled statement derived from a first statement accessing a first view V1 may be an empty result set having the same structure (e.g. column names, number and type) as the first view in DBMS1. In other embodiments in which the first DBMS supports receiving result sets whose structure differs from the structure of the data container accessed by the statement for which the result set was returned, the result set RS1 may comprise the rewritten labeled statement (preferentially after having removed the label by the receiver module), e.g. in the form of a CLOB or a table comprising VARCHAR statement chunks and INT sequence numbers of the chunks.

Upon the first SP determines that for each first statement obtained from the first SP a respective result set RS1 was received, the first SP automatically determines that all first statements were successfully rewritten into a statement that can be executed in DBMS2 and triggers in step 322 the execution of the requested computational task by calling the second SP 166 implementing the computational task. The call to SP2 is performed via the receiver module 135 in order to enable the receiver module to evaluate the arguments of the call in order to identify, via a task-name provided as argument in the call and task-IDs of the second SPs in DBMS2, the one of the second SPs to be executed and in order to identify, via first data container names provided as argument in the call and container-IDs of first data containers assigned to respective rewritten labeled statements, the second data container names and rewritten statements to replace said first data container names when executing the identified SP2.

The procedure execution module is notified by the first SP that the requested computational task shall be executed in DBMS2. Thereby, the first DBMS provides a name or ID of the requested computational task and provides names or IDs of the first data containers (tables or views in DBMS1) to be used as input or output data containers. The procedure execution module of the receiver module evaluates said provided names and IDs and evaluates the task-IDs and container-IDs assigned to the (previously received) rewritten labeled statements for calling the second SP with resolved second data container references, i.e., second data container names and/or rewritten statements replacing view specifications and/or procedures of the DBMS1, e.g. DBMS1-specific UDFs.

The procedure execution module identifies and provides the ones of the second data containers to be used as input or output data containers by the second stored procedure and the rewritten statement derived from the first statement accessing the first view as arguments to the second stored procedure for enabling the second stored procedure to perform the computational task in the second DBMS.

For example, the receiver module may provide task-ID and container-ID to the called SP2 as an argument to inform the procedure execution module which ones of the second data containers to use as input or output data containers. The procedure execution module may provide the rewritten statement derived from the first statement directed at the first view as an argument to the called SP2 for enabling the SP2 to create a functionally corresponding second view or to enable the called SP2 to execute the rewritten statement to retrieve the same data as would be retrieved upon calling such a second view. The result set RS2 obtained by executing the second SP 116 is returned via the receiver module to the first DBMS and from there to the requesting client application.

According to embodiments, the SP2 is called by the process execution module preferably within a session context of the request.

By dispatching the execution of a computational task, in particular a data analysis task, from the first DBMS to the second DBMS, the computational load of the first DBMS may be reduced. This is particularly advantageous if the first DBMS is optimized for different kinds of statements than the second DBMS. For example, the first DBMS could be an OLTP system optimized for OLTP statements, the second DBMS could be optimized for analytical (OLAP) statements. Thus, computational resources of the system hosting the first DBMS may be mainly or completely used for processing database statements that can be processed efficiently in the first DBMS. The second DBMS may be an OLAP system and the table structure of the second DBMS may be specially optimized for performing analytical queries efficiently.

According to other examples, the first DBMS could be a DB2/zOS database lacking some suitable stored procedures to perform a particular computational task while the second DBMS, e.g. DB2 LUW, could comprise appropriate stored procedures. In this, case, rewriting a statement directed at such a function and dispatching the execution of said statement, in particular an analytical computational task, may reduce the total time necessary for performing the analysis.

A "system" or "data management system" as used herein is a data processing system comprising at least a first DBMS and one or more second DBMS, whereby at least a fraction of the data of the first DBMS is transferred to the one or more second DBMS for synchronizing said data fraction of the first DBMS with the data of the second DBMS(s). In some embodiments, the first DBMS is speed-optimized for other types of queries than the second DBMS(s). For example, the first DBMS may be an OLTP system and the second DBMS (s) may be an OLAP system. For example, the first DBMS may be DB2 for z/OS and at least one second DBMS could be, for example, the "analytics accelerator" for DB2. In some embodiments, the first and second DBMS are of the same type, e.g. an OLTP database management system (DBMS), and OLAP DBMS, a graph based DBMS, a triple store, a columnar DBMS or the like. In other embodiments, they are of a different type. For example, the first DBMS could be a row-oriented DBMS and the second DBMS could be a column-oriented DBMS. In some embodiments the first and/or second DBMMs are implemented as in-memory DBMSs. The data management system may be a federated DBMS system wherein at least a fraction of the data of the first DBMS is transferred to the one or more second DBMS. In some embodiments, the first DBMS is not able to access the second catalogue of any one of the second DBMS and no second DBMS is able to access the first catalogue of the first DBMS. The first and second DBMS have different user management modules respectively responsible for creating, managing and deleting users and their respective privileges.

A "data container" as used herein is a database table or a database view. The expressions "first data containers", a "first views" and "first tables" refer to containers, tables and views stored in the first DBMS. The expressions "second data containers", "second views" and "second tables" refer to containers, tables and views stored in the second DBMS.

The first and second DBMS may be hosted on the same data processing machine or on different data processing machines connected to each other via a network. In this case, the data management system can be implemented in the form of a distributed system, e.g. a distributed federated DBMS.

According to some embodiments, the second DBMS lacks an interface for receiving requests from the client system and the first DBMS is configured to receive the request of the client application via an interface of the data management system. Thus, the combination of the first and second DBMS or a combination of the first and multiple second DBMS may appear to the client as a single monolithic DBMS comprising a single interface for receiving requests. However, "under the hood", said system may comprise two different database management systems with respective user management modules whose data is at least partially synchronized. Such a "combined" DBMS may be capable of processing a request faster than a DBMS comprising only a single DBMS-core.

The first and/or the second DBMS can be, for example, an OLAPDBMS, an OLTP-DBMS, a graph-based DBMS, a triplestore-DBMS, a key-value ("correlation")-DBMS, a document-based DBMS, a row-oriented DBMS, a column-oriented DBMS and the second DBMM could be any other one of said DBMS-types. A "column oriented"-DBMS is a DBMS that stores data tables as sections of columns of data rather than as rows of data by serializing all of the values of a column together, then the values of the next column. A "row oriented"-DBMS is a DBMS that stores data tables as sections of rows of data rather than as columns of data by serializing all of the values of a row together, then the values of the next row.

The first and/or second DBMS can be, for example, DB2, Oracle, MySQL or the like whose functionality may be extended by installing appropriate plug-ins and extension modules. The second DBMS can be, for example, an accelerator, e.g. Netezza.

The first DBMS is configured for managing first data containers being organized in accordance with a first storage format, e.g. a row-store format, and each of the one or more second DBMS is configured for managing second data containers, the second data containers being organized in accordance with a different, second storage format, e.g. a column-store data format. For example, all or most of the first tables could be organized in row-major order and all or most of the second tables could be organized in column-major order. The first DBMS is configured for computing efficient query execution plans for tables in row-major order and the second DBMS is configured for computing efficient query execution plans for tables in column-major order. Row-major order and column-major order describe methods for arranging multidimensional arrays in linear storage such as memory. In row-major order, consecutive elements of the rows of the array are contiguous in memory. In column-major order, consecutive elements of the columns are contiguous. Array layout is important for performance when traversing an array because accessing array elements that are contiguous in memory is usually faster than accessing elements which are not, due to caching.

The second DBMS may be an accelerator of the first DBMS. An "accelerator system" or "accelerator" as used herein is a DBMS designed to allow the querying of data in a particularly fast manner. An accelerator system may be a conventional DBMS coupled to another DBMS or may be a module or plug-in that needs to be operatively coupled to another (the "first") DBMS in order to be operable to function, e.g., to analyze data. Said module or plug-in may not be usable on its own. When coupled to the other DBMS, e.g. a "first DBMS", the accelerator system is configured to act as an "accelerator" of the first DBMS, because it is capable of processing at least some kinds of database queries faster than the first DBMS.

A "database management system" (DBMS) is an application designed to allow the definition, creation, querying, update, and administration of databases having one or more different storage formats. A DBMS as used herein is an application. It is a self-contained executable that can be saved to a customer's computer and launched directly, or is an executable that needs to be installed before it can be launched. In some embodiments, the DBMS and at least one further DBMS are part of a data management system, e.g. are integrated as a common data management framework that provides a single SQL query interface to a query.

A storage format defines the manner how data stored in and managed by the DBMS is stored. Examples for storage formats are "column-major" and "row-major" storage format.

A "database" as used herein is an information structure which comprises one or more data containers, e.g. tables and views, whereby the use of said data containers is controlled by a DBMS. Said "use" may comprise, for example, reading data from a data container, storing data in a data container, manipulating or evaluating the structure of a data container or planning query execution on multiple ones of said data containers. The database may be a relational database, an object oriented database, or any other kind of database. Accordingly, the DBMS may be a relational DBMS, an object oriented DBMS, an OLAP DBMS, an OLTP DBMS, or any other kind of DBMS.

A "catalogue" or "database catalogue" as used herein is a component of a database management module that comprises metadata in which definitions of database objects such as data containers such as base tables and views, synonyms, value ranges, indexes, users, user groups, user- and group-specific permissions, stored procedures and/or user defined functions are stored. According to preferred embodiments, the catalogue is accessible by a uniform SQL standard called the INFORMATION SCHEMA, but there exist also database-specific metadata access methods, e.g. for Oracle databases. A catalog may be specific for data containers of a particular storage format.

A "stored procedure" as used herein is a subroutine available to applications that access a DBMS. A stored procedure ("SP") is typically stored in the catalogue of a DBMS. Stored procedures may be used for data validation and/or data analysis integrated into a DBMS. They can consolidate and centralize logic that was originally implemented in applications, thereby increasing performance by avoiding data traffic between the DBMS and an external application and by making use of performance-optimized database operations. Stored procedures may return result sets, may contain declared variables for processing data and cursors that allow it to loop through multiple rows in a table. The exact and correct implementation of stored procedures varies from one database system to the other. Most major database vendors support them in some form. Depending on the database system, stored procedures can be implemented in a variety of programming languages, for example SQL, Java, C, or C++. Stored procedures written in non-SQL programming languages may or may not execute SQL statements themselves.

A stored procedure may comprise or be implemented as a user defined function (UDF). For example, the second stored procedure in the second DBMS may comprise or consist of a particular UDF whose specification is completely implemented in plain SQL text. Alternatively, the second stored procedure is or comprises a reference to a module having implemented the UDF. Said module may have been installed or loaded to the DBMS2. Said module may be, for example, a Java, C++ or C# module.

A "computational task" is a computational process designed to provide a particular result. For example, a computational task could be an analytical task, e.g. a clustering algorithm such as k-means, native Bayes, k-nearest neighbors, simple linear regression, multiple regression, logistic regression, decision trees, neural networks, and the like. It can also be a simulation or modeling task or any other form of data processing operation. The performing of a computational task may involve reading data from a plurality of tables and/or views and may involve the creation of intermediate results.

A "rewritten statement" as used herein is a database statement that is—without any further amendments—executable by the second DBMS. Thus, a rewritten statement is only allowed to comprise references to second container names, e.g. second tables or second views, and/or references to stored procedures which are contained in or supported by the second DBMS.

A "QUERY REWRITE function", as used herein, is a function capable of rewriting a statement directed at a view in a manner that the rewritten statement, when being executed, obtains the same data as would be obtained when calling the view, whereby the rewritten statement accesses only database tables (no other views) in a SQL syntax interpretable by the second DBMS. In addition, the QUERY REWRITE function is in some embodiments able to resolve stored procedures of the first DBMS, e.g. UDFs or procedures provided already by the first DBMS, into SQL expressions interpretable and executable by the second DBMS. The replacement of first data container names by mapped second data container names may be performed by the QUERY REWRITE function or by other routines or modules of the first DBMS used for performing the rewriting of the obtained first and second statements.

A "synchronization mapping" as used herein is a mapping between first tables of a first DBMS and second tables of a second DBMS. The data content of at least some of the first tables is transferred to and thus synchronized with one or more specific second tables. The synchronization mapping specifies which ones of the second tables receive data from which ones of the first tables. In the synchronization mapping, each of the synchronized first tables has assigned one or more second tables whose data content is synchronized with the data content of said first table.

A "query" as used herein is a read request for information from a database and/or a write request for storing data in said database. A query can comprise a SELECT, UPDATE, INSERT or DELETE statement or any combination thereof. For example, multiple SQL statements may be combined in a complex manner via JOIN clauses.

A "schema definition" as used herein is the definition of the structure of a database table or view, the definition being provided in a formal language supported by the DBMS managing said tables or views. In a relational database, a schema definition specifies the table name, the columns contained therein and the relationships between columns and tables.

Aspects of embodiments herein are described with reference to flowchart illustrations and/or block diagrams of methods, apparatus (systems), and computer program products. It can be understood that each block of the flowchart illustrations and/or block diagrams, and combinations of blocks in the flowchart illustrations and/or block diagrams, can be implemented by computer readable program instructions.

Technical effects and benefits of embodiments herein include providing for an improved system, method and computer program product for executing a computational task using stored procedures as specified in the independent claims. Embodiments herein can be freely combined with each other if they are not mutually exclusive.

According to an embodiment, a computer-implemented method for executing a computational task in a data management system is provided. The data management system comprises a first DBMS comprising first data containers; a second DBMS comprising second data containers; a receiver module being operatively coupled to the second DBMS; and a synchronization-mapping specifying from which ones of the first data containers data is transferred to which ones of the second data containers in a synchronization process between the first and the second DBMSs. The computer-implemented method comprises storing a first stored procedure in the first DBMS, the first stored procedure being configured to receive names of one or more of the first data containers to act as input or output data containers and comprising first statements configured for triggering resolution of features of a respective first input or output data container; storing a second stored procedure in the second DBMS, the second stored procedure implementing a computational task and being configured to operate on one or more of the second data containers; receiving, by the first DBMS, a request from a client application to perform the computational task; Further, the computer-implemented method comprises, in response to receiving the request, an execution by the first DBMS of: starting to execute the first stored procedure, the first DBMS thereby obtaining statements directed at one or more of the first data containers, the obtained statements comprising the first statements, at least one of the obtained first statements being directed at a first data container being a first view; evaluating the synchronization mapping for identifying one or more second tables mapped to any one of the first data containers the obtained statements are directed at; selectively labeling, by the first DBMS, the ones of the obtained statements which are first statements; rewriting the obtained statements for providing rewritten statements being interpretable by the second DBMS, the rewriting comprising replacing first data container names in the obtained statements by their respectively mapped second container names; and selectively assigning each rewritten and labeled statement a task-ID of the requested computational task and a container-ID of the first data container specified in the first statement said rewritten and labeled statement was derived from.

According to another embodiment or the computer-implemented method embodiment above, the computer-implemented method can comprise receiving, by the receiver module, the rewritten statements, at least one of the rewritten statements being labell
ed; in case the received rewritten statement is labeled, notifying, by the receiver module, the first DBMS that the rewritten labeled statement was received, the notification being performed without executing the labeled statement in the second DBMS; and upon the receiver module having received a result set at least for each of the rewritten labeled statements, triggering, by the first stored procedure or the receiver module, the execution of the second stored procedure in the second DBMS, the receiver module thereby using the task-ID and the container-ID of each received rewritten labeled statement for identifying the second stored procedure implementing the requested computational task and for identifying the ones of the second data containers to be used as input or output data containers by the second stored procedure for performing the computational task in the second DBMS.

According to an embodiment, a computer program product for operating a data management system is provided. The computer program product comprises a computer readable storage medium having program instructions embodied therewith, the program instructions executable by a processor to cause the processor to execute the computer-implemented method for executing a computational task according.

According to an embodiment, a data management system is provided. The data management system comprises a first DBMS comprising first data containers and a first stored procedure, the first stored procedure being configured to receive names of one or more of the first data containers to act as input or output data containers and comprising first statements configured for triggering resolution of features of a respective first input or output data container; a second DBMS comprising second data containers and a second stored procedure, the second stored procedure implementing a computational task and being configured to operate on one or more of the second data containers; a receiver module being operatively coupled to the second DBMS; and a synchronization-mapping specifying from which ones of the first data containers data is transferred to which ones of the second data containers in a synchronization process between the first and the second DBMSs.

According to another embodiment or the data management system embodiment above, the first DBMS can be configured for receiving a request from a client application to perform the computational task. Further, in response to receiving the request, the first DBMS can be configured for starting to execute the first stored procedure, the first DBMS thereby obtaining statements directed at one or more of the first data containers, the obtained statements comprising the first statements, at least one of the obtained first statements being directed at a first data container being a first view; evaluating, by the first DBMS, the synchronization mapping for identifying one or more second tables mapped to any one of the first data containers the obtained statements are directed at; selectively labelling the ones of the obtained statements which are first statements; rewriting the obtained statements for providing rewritten statements being interpretable by the second DBMS, the rewriting comprising replacing first data container names in the obtained statements by their respectively mapped second container names; and selectively assigning each rewritten and labeled statement a task-ID of the requested computational task and a container-ID of the first data container specified in the first statement said rewritten and labeled statement was derived from;

According to another embodiment or the data management system embodiment above, the receiver module can be configured for: receiving, by the receiver module, the rewritten statements, at least one of the rewritten statements being labeled; and in case the received rewritten statement is labeled, notifying, by the receiver module, the first DBMS that the rewritten labeled statement was received, the notification being performed without executing the labeled statement in the second DBMS.

According to another embodiment or the data management system embodiment above, the first stored procedure or the receiver module can be configured for, upon the receiver module having received a result set at least for each of the rewritten labeled statements, triggering the execution of the second stored procedure in the second DBMS, the receiver module thereby using the task-ID and the container-ID of each received rewritten labeled statement for identifying the second stored procedure implementing the requested computational task and for identifying the ones of the second data containers to be used as input or output data containers by the second stored procedure for performing the computational task in the second DBMS.

According to an embodiment, a computer-implemented method for executing a computational task in a data management system is provided. The data management system comprises a first DBMS comprising first data containers; a second DBMS comprising second data containers; a receiver module being operatively coupled to the second DBMS; and a synchronization-mapping specifying from which ones of the first data containers data is transferred to which ones of the second data containers in a synchronization process between the first and the second DBMSs. The computer-implemented method comprises storing a first stored procedure in the first DBMS, the first stored procedure being configured to receive names of one or more of the first data containers to act as input or output data containers and comprising first statements configured for triggering resolution of features of a respective first input or output data container; storing a second stored procedure in the second DBMS, the second stored procedure implementing a computational task and being configured to operate on one or more of the second data containers; receiving, by the first DBMS, a request from a client application to perform the computational task; in response to receiving the request: starting to execute, by the first DBMS, the first stored procedure, the first DBMS thereby obtaining statements directed at one or more of the first data containers, the obtained statements comprising the first statements, at least one of the obtained first statements being directed at a first data container being a first view; evaluating, by the first DBMS, the synchronization mapping for identifying one or more second tables mapped to any one of the first data containers the obtained statements are directed at; selectively labeling, by the first DBMS, the ones of the obtained statements which are first statements; rewriting, by the first DBMS, the obtained statements for providing rewritten statements being interpretable by the second DBMS, the rewriting comprising replacing first data container names in the obtained statements by their respectively mapped second container names; selectively assigning, by the first DBMS, each rewritten and labeled statement a task-ID of the requested computational task and a container-ID of the first data container specified in the first statement said rewritten and labeled statement was derived from; receiving, by the receiver module, the rewritten statements, at least one of the rewritten statements being labeled; in case the received rewritten statement is labeled, notifying, by the receiver module, the first DBMS that the rewritten labeled statement was received, the notification being performed without executing the labeled statement in the second DBMS; and upon the receiver module having received a rewritten labeled statement at least for each of the first statements, triggering, by the first stored procedure or the receiver module, the execution of the second stored procedure in the second DBMS, the receiver module thereby using the task-ID and the container-ID of each received rewritten labeled statement for identifying the second stored procedure implementing the requested computational task and for identifying the ones of the second data containers to be used as input or output data containers by the second stored procedure for performing the requested computational task in the second DBMS.

According to another embodiment or the computer-implemented method above, the obtained statements can comprise one or more second statements, the second statements being rewritten but not labeled. The computer-implemented method can also comprise, in response to the receiving of each of the rewritten statements: determining, by the receiver module, that the received rewritten statement is not labeled; and using, by the receiver module, an SQL interface of the second DBMS for selectively executing the received, non-labeled rewritten statement in the second DBMS.

According to another embodiment or the computer-implemented method above, the rewriting each of the first statements can comprise: determining, by the first DBMS, if the first statement is directed at a view; and if the first statements is directed at a view, using, by the first DBMS, a QUERY-REWRITE-function of the first DBMS for identifying the names of the tables in the first DBMS accessed by the view.

According to another embodiment or the computer-implemented method above, the rewriting each of the first statements can comprise: determining, by the first DBMS, if the first statement comprises a call to a further stored procedure implemented by the first DBMS; and if the first statements comprises said call, using, by the first DBMS, a QUERY-REWRITE-function of the first DBMS for identifying the names of the tables in the first DBMS accessed by said further stored procedure and for identifying names of a still further stored procedure available in the second DBMS, the still further stored procedure being capable of performing the same task as the further stored procedure.

According to another embodiment or the computer-implemented method above, the computer-implemented method can comprise: providing a first and a second data storage location, the first and second data storage location being writable by the first DBMS and being at least readable by the receiver module.

According to another embodiment or the computer-implemented method above, the selective labeling can comprise: selectively storing, by the first DBMS, all obtained rewritten statements being derived from a first statement in a first data storage location; and selectively storing, by the first DBMS, all obtained rewritten statements not being derived from a first statement in a second data storage location.

According to another embodiment or the computer-implemented method above, the selective labeling can comprise: selectively storing, by the first DBMS, for each obtained rewritten statement being derived from a first statement, an environment variable in the register of the second DBMS, the environment variable indicating that the obtained rewritten statement is a labeled statement.

According to another embodiment or the computer-implemented method above, the selective labeling can comprise adding, by the first DBMS, a prefix, infix or suffix selectively to all obtained rewritten statements derived from a first statement.

According to another embodiment or the computer-implemented method above, the computer-implemented method can comprise extracting, by the receiver module, the task-ID and the container-ID from each received labeled statement for identifying the second stored procedure implementing the requested computational task and for providing the received and rewritten first statements comprising the resolved second data container names to corresponding arguments of the identified second stored procedure.

According to another embodiment or the computer-implemented method above, the assigning of the task-ID and the container-ID to a rewritten first statement can comprise storing the task-ID and the container-ID in a data storage location in association with the rewritten first statement, the data storage location being writable by the first DBMS and being at least readable by the receiver module.

According to another embodiment or the computer-implemented method above, the assigning of the task-ID and the container-ID to a rewritten first statement can comprise adding, by the first DBMS, a prefix, infix or suffix each obtained rewritten first statement.

According to another embodiment or the computer-implemented method above, the notifying of the first DBMS that the receiver module received the rewritten labeled statement derived from the first statement directed at the first view can comprise: returning, by the receiver module, a result set with null data records, the structure of the result set being identical to the structure of the first view.

According to another embodiment or the computer-implemented method above, the notifying of the first DBMS that the receiver module received the rewritten labeled statement derived from the first statement directed at the first view can comprise: chunking the rewritten statement into one or more chunks being as large or smaller than a predefined maximum length; creating a result set comprising at least a first column and a second column, the second column having the predefined maximum length; and filling the second column with the chunks and filling the first column with sequence numbers of the respective chunks.

According to another embodiment or the computer-implemented method above, the notifying of the first DBMS that the receiver module received the rewritten labeled statement derived from the first statement directed at the first view can comprise: creating a result set comprising at least a column of CLOB type; and filling the column with the rewritten statement.

According to another embodiment or the computer-implemented method above, the computer-implemented method can comprise: automatically creating, by the receiver module, a second view in the second DBMS, the specification of the second view consisting of the rewritten statement derived from the first statement directed at the first view.

According to another embodiment or the computer-implemented method above, the second stored procedure can use, upon being called, the created second view for the reading of the input data.

According to another embodiment or the computer-implemented method above, the second DBMS can be lacking an interface for receiving requests from client applications and the first DBMS can be configured to receive the request of the client application via an interface that is also used as interface of the data management system.

According to another embodiment or the computer-implemented method above, the computer-implemented method can comprise: determining, by the first DBMS for each of the first data containers whose name is specified in one of the obtained rewritten statements, if the client application has all necessary privileges to access said first data container; and only in case the client system has all necessary privileges to access all identified first data containers, performing the rewriting of the obtained statements; and in case the client application lacks one or more necessary privileges to access all first data containers specified in any of the obtained statements, terminating the method.

According to another embodiment or the computer-implemented method above, the first data containers can comprise database tables and views, wherein at the moment of receiving the request only the first data containers which are database tables are synchronized with the second DBMS and are mapped via the synchronization-mapping to one or more of the second data containers.

According to another embodiment or the computer-implemented method above, the receiver module can comprise a decision module and a procedure execution module, the decision module being configured for evaluating the received rewritten queries for executing each non-labeled rewritten statement in the second DBMS via a standard SQL interface of the second DBMS and for returning a result set to the first DBMS for each rewritten labeled statement instead of executing the rewritten first statements via said standard SQL interface.

According to another embodiment or the computer-implemented method above, the computer-implemented method can comprise: transferring, by the decision module, each rewritten and labeled first statement and its assigned task-ID and container-ID to the procedure execution module; identifying, by the procedure execution module, the second stored procedure assigned to the requested computational task via the task-ID; and providing, by the procedure execution module, the rewritten statement derived from the first statement directed at the first view to the identified second stored procedure, thereby providing a resolved first view specification interpretable by the second DBMS and the names of the second data tables to be accessed when performing the resolved view definition for enabling the second stored procedure to perform the requested computational task.

According to an embodiment, a data management system is provided. The data management system comprises a first DBMS comprising first data containers and a first stored procedure, the first stored procedure being configured to receive names of one or more of the first data containers to act as input or output data containers and comprising first statements configured for triggering resolution of features of a respective first input or output data container; a second DBMS comprising second data containers and a second stored procedure, the second stored procedure implementing a computational task and being configured to operate on one or more of the second data containers; a receiver module being operatively coupled to the second DBMS; a synchronization-mapping specifying from which ones of the first data containers data is transferred to which ones of the second data containers in a synchronization process between the first and the second DBMSs; the first DBMS being configured for: receiving a request from a client application to perform the computational task; in response to receiving the request: starting to execute the first stored procedure, the first DBMS thereby obtaining statements directed at one or more of the first data containers, the obtained statements comprising the first statements, at least one of the obtained first statements being directed at a first data container being a first view; evaluating, by the first DBMS, the synchronization mapping for identifying one or more second tables mapped to any one of the first data containers the obtained statements are directed at; selectively labeling the ones of the obtained statements which are first statements; rewriting the obtained statements for providing rewritten statements being interpretable by the second DBMS, the rewriting comprising replacing first data container names in the obtained statements by their respectively mapped second container names; selectively assigning each rewritten and labeled statement a task-ID of the requested computational task and a container-ID of the one of the first data containers first data container specified in the first statement said rewritten and labeled statement was derived from; the receiver module being configured for: receiving, by the receiver module, the rewritten statements, at least one of the rewritten statements being labeled; in case the received rewritten statement is labeled, notifying, by the receiver module, the first DBMS that the rewritten labeled statement was received, the notification being performed without executing the labeled statement in the second DBMS; the first stored procedure or the receiver module being configured for, upon the receiver module having received a result set at least for each of the rewritten labeled statements, triggering the execution of the second stored procedure in the second DBMS, the receiver module thereby using the task-ID and the container-ID of each received rewritten labeled statement for identifying the second stored procedure implementing the requested computational task and for identifying the ones of the second data containers to be used as input or output data containers by the second stored procedure for performing the computational task in the second DBMS.

Embodiments herein may be a system, a method, and/or a computer program product. The computer program product may include a computer readable storage medium (or media) having computer readable program instructions thereon for causing a processor to carry out aspects of the embodiments herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments herein.

Aspects of the embodiments herein are described with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments herein. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for using stored procedures to improve execution of a computational task in a data management system, the method comprising:
   storing a first stored procedure of the procedures in a first database management system (DBMS) comprising first data containers, the first stored procedure being configured to receive names of one or more of the first data containers to act as input or output data containers, and the first stored procedure comprising first statements configured for triggering resolution of features of a respective first input or output data container;
   storing a second stored procedure of the procedures in a second DBMS comprising second data containers, the second stored procedure implementing the computational task, and the second stored procedure being configured to operate on one or more of the second data containers;
   receiving, by the first DBMS, a request from a client application to perform the computational task;
   in response to receiving the request:
      starting to execute, by the first DBMS, the first stored procedure, the first DBMS thereby obtaining statements directed at one or more of the first data containers, the obtained statements comprising the first statements, at least one of the obtained first statements being directed at a first data container being a first view;
      evaluating, by the first DBMS, a synchronization mapping specifying from which ones of the first data containers data is transferred to which ones of the second data containers in a synchronization process between the first and the second DBMSs, the evaluating of the synchronization mapping identifies one or more second tables mapped to any one of the first data containers the obtained statements are directed at;
      selectively labeling, by the first DBMS, the ones of the obtained statements which are first statements;
      rewriting, by the first DBMS, the obtained statements for providing rewritten statements being interpretable by the second DBMS, the rewriting comprising replacing first data container names in the obtained statements by their respectively mapped second container names;
      selectively assigning, by the first DBMS, each rewritten and labeled statement a task-ID of the requested computational task and a container-ID of the first data container specified in the first statement said rewritten and labeled statement was derived from;
      receiving, by a receiver module being operatively coupled to the second DBMS, the rewritten statements, at least one of the rewritten statements being labeled;
      in case the received rewritten statement is labeled, notifying, by the receiver module, the first DBMS that the rewritten labeled statement was received, the notification being performed without executing the labeled statement in the second DBMS; and
      upon the receiver module having received a rewritten labeled statement at least for each of the first statements, triggering, by the first stored procedure or the receiver module, the execution of the second stored procedure in the second DBMS, the receiver module thereby using the task-ID and the container-ID of each received rewritten labeled statement for identifying the second stored procedure implementing the requested computational task and for identifying the ones of the second data containers to be used as input or output data containers by the second stored procedure for performing the requested computational task in the second DBMS.

2. The method of claim 1, wherein the obtained statements comprises one or more second statements,
   wherein the one or more second statements being rewritten and not labeled,
   the method comprising:
      in response to the receiving of each of the rewritten statements:
         determining, by the receiver module, that the received rewritten statement is not labeled; and
         using, by the receiver module, an SQL interface of the second DBMS for selectively executing the received, non-labeled rewritten statement in the second DBMS.

3. The method of claim 1, wherein the rewriting each of the first statements comprises:
   determining, by the first DBMS, if the first statement is directed at a view; and
   if the first statements is directed at a view, using, by the first DBMS, a QUERY-REWRITE-function of the first DBMS for identifying the names of the tables in the first DBMS accessed by the view.

4. The method of claim 1, wherein the rewriting each of the first statements comprising:
   determining, by the first DBMS, if the first statement comprises a call to a further stored procedure implemented by the first DBMS; and
   if the first statements comprises said call, using, by the first DBMS, a QUERY-REWRITE-function of the first DBMS for identifying the names of the tables in the first DBMS accessed by said further stored procedure and for identifying names of a still further stored procedure available in the second DBMS, the still further stored procedure being capable of performing the same task as the further stored procedure.

5. The method of claim 1, comprising:
   providing a first and a second data storage location, the first and second data storage location being writable by the first DBMS and being at least readable by the receiver module;
   wherein the selective labeling comprises:
      selectively storing, by the first DBMS, all obtained rewritten statements being derived from a first statement in a first data storage location; and
      selectively storing, by the first DBMS, all obtained rewritten statements not being derived from a first statement in a second data storage location.

6. The method of claim 1, wherein the selective labeling comprises:

selectively storing, by the first DBMS, for each obtained rewritten statement being derived from a first statement, an environment variable in the register of the second DBMS, the environment variable indicating that the obtained rewritten statement is a labeled statement.

7. The method of claim 1, wherein the selective labeling comprises adding, by the first DBMS, a prefix, infix or suffix selectively to all obtained rewritten statements derived from a first statement.

8. The method of claim 1, comprising:
extracting, by the receiver module, the task-ID and the container-ID from each received labeled statement for identifying the second stored procedure implementing the requested computational task and for providing the received and rewritten first statements comprising the resolved second data container names to corresponding arguments of the identified second stored procedure.

9. The method of claim 1, wherein the assigning of the task-ID and the container-ID to a rewritten first statement comprises storing the task-ID and the container -ID in a data storage location in association with the rewritten first statement, the data storage location being writable by the first DBMS and being at least readable by the receiver module.

10. The method of claim 1, wherein the assigning of the task-ID and the container-ID to a rewritten first statement comprises adding, by the first DBMS, a prefix, infix or suffix each obtained rewritten first statement.

11. The method of claim 1, wherein the notifying of the first DBMS that the receiver module received the rewritten labeled statement derived from the first statement directed at the first view comprises:
returning, by the receiver module, a result set with null data records, the structure of the result set being identical to the structure of the first view.

12. The method of claim 1, wherein the notifying of the first DBMS that the receiver module received the rewritten labeled statement derived from the first statement directed at the first view comprises:
chunking the rewritten statement into one or more chunks being as large or smaller than a predefined maximum length;
creating a result set comprising at least a first column and a second column, the second column having the predefined maximum length; and
filling the second column with the chunks and filling the first column with sequence numbers of the respective chunks.

13. The method of claim 1, the notifying of the first DBMS that receiver module received the rewritten labeled statement derived from the first statement directed at the first view comprising:
creating a result set comprising at least a column of CLOB type; and
filling the column with the rewritten statement.

14. The method of claim 1, comprising:
automatically creating, by the receiver module, a second view in the second DBMS, the specification of the second view consisting of the rewritten statement derived from the first statement directed at the first view; and
the second stored procedure using, upon being called, the created second view for the reading of the input data.

15. The method of claim 1, the second DBMS lacking an interface for receiving requests from client applications, the first DBMS being configured to receive the request of the client application via an interface that is also used as interface of the data management system.

16. The method of claim 1, comprising:
determining, by the first DBMS for each of the first data containers whose name is specified in one of the obtained rewritten statements, if the client application has all necessary privileges to access said first data container;
only in case the client system has all necessary privileges to access all identified first data containers, performing the rewriting of the obtained statements; and
in case the client application lacks one or more necessary privileges to access all first data containers specified in any of the obtained statements, terminating the method.

17. The method of claim 1, the first data containers comprising database tables and views, wherein at the moment of receiving the request only the first data containers which are database tables are synchronized with the second DBMS and are mapped via the synchronization-mapping to one or more of the second data containers.

18. The method of claim 1, wherein the receiver module comprises a decision module and a procedure execution module;
wherein the decision module is configured for evaluating the received rewritten queries for executing each non-labeled rewritten statement in the second DBMS via a standard SQL interface of the second DBMS and for returning a result set to the first DBMS for each rewritten labeled statement instead of executing the rewritten first statements via said standard SQL interface;
the method comprising:
transferring, by the decision module, each rewritten and labeled first statement and its assigned task-ID and container-ID to the procedure execution module;
identifying, by the procedure execution module, the second stored procedure assigned to the requested computational task via the task-ID; and
providing, by the procedure execution module, the rewritten statement derived from the first statement directed at the first view to the identified second stored procedure, thereby providing a resolved first view specification interpretable by the second DBMS and the names of the second data tables to be accessed when performing the resolved view definition for enabling the second stored procedure to perform the requested computational task.

19. A computer program product for operating a data management system, the computer program product comprising a computer readable storage medium having program instructions for using stored procedures to improve execution of a computational task embodied therewith, the program instructions executable by a processor to cause the processor to perform:
storing a first stored procedure of the procedures in a first database management system (DBMS) comprising first data containers, the first stored procedure being configured to receive names of one or more of the first data containers to act as input or output data containers, and the first stored procedure comprising first statements configured for triggering resolution of features of a respective first input or output data container;
storing a second stored procedure of the procedures in a second DBMS comprising second data containers, the second stored procedure implementing the computational task, and the second stored procedure being configured to operate on one or more of the second data containers;

receiving, by the first DBMS, a request from a client application to perform the computational task;

in response to receiving the request:

starting to execute, by the first DBMS, the first stored procedure, the first DBMS thereby obtaining statements directed at one or more of the first data containers, the obtained statements comprising the first statements, at least one of the obtained first statements being directed at a first data container being a first view;

evaluating, by the first DBMS, a synchronization mapping specifying from which ones of the first data containers data is transferred to which ones of the second data containers in a synchronization process between the first and the second DBMSs, the evaluating of the synchronization mapping identifies one or more second tables mapped to any one of the first data containers the obtained statements are directed at;

selectively labeling, by the first DBMS, the ones of the obtained statements which are first statements;

rewriting, by the first DBMS, the obtained statements for providing rewritten statements being interpretable by the second DBMS, the rewriting comprising replacing first data container names in the obtained statements by their respectively mapped second container names;

selectively assigning, by the first DBMS, each rewritten and labeled statement a task-ID of the requested computational task and a container-ID of the first data container specified in the first statement said rewritten and labeled statement was derived from;

receiving, by a receiver module being operatively coupled to the second DBMS, the rewritten statements, at least one of the rewritten statements being labeled;

in case the received rewritten statement is labeled, notifying, by the receiver module, the first DBMS that the rewritten labeled statement was received, the notification being performed without executing the labeled statement in the second DBMS; and upon the receiver module having received a rewritten labeled statement at least for each of the first statements, triggering, by the first stored procedure or the receiver module, the execution of the second stored procedure in the second DBMS, the receiver module thereby using the task-ID and the container-ID of each received rewritten labeled statement for identifying the second stored procedure implementing the requested computational task and for identifying the ones of the second data containers to be used as input or output data containers by the second stored procedure for performing the requested computational task in the second DBMS.

20. A data management system using stored procedures to improve execution of a computational task therein, the data management system comprising:

a first DBMS comprising first data containers and a first stored procedure of the procedures, the first stored procedure being configured to receive names of one or more of the first data containers to act as input or output data containers and comprising first statements configured for triggering resolution of features of a respective first input or output data container;

a second DBMS comprising second data containers and a second stored procedure of the procedures, the second stored procedure implementing a computational task and being configured to operate on one or more of the second data containers;

a receiver module being operatively coupled to the second DBMS;

a synchronization-mapping specifying from which ones of the first data containers data is transferred to which ones of the second data containers in a synchronization process between the first and the second DBMSs;

wherein the first DBMS is configured to receiving a request from a client application to perform the computational task;

wherein the first DBMS is configured to, in response to receiving the request:

starting to execute the first stored procedure, the first DBMS thereby obtaining statements directed at one or more of the first data containers, the obtained statements comprising the first statements, at least one of the obtained first statements being directed at a first data container being a first view;

evaluating, by the first DBMS, the synchronization mapping for identifying one or more second tables mapped to any one of the first data containers the obtained statements are directed at;

selectively labeling the ones of the obtained statements which are first statements;

rewriting the obtained statements for providing rewritten statements being interpretable by the second DBMS, the rewriting comprising replacing first data container names in the obtained statements by their respectively mapped second container names;

selectively assigning each rewritten and labeled statement a task-ID of the requested computational task and a container-ID of the one of the first data containers first data container specified in the first statement said rewritten and labeled statement was derived from;

wherein the receiver module is configured to:

receiving, by the receiver module, the rewritten statements, at least one of the rewritten statements being labeled;

in case the received rewritten statement is labeled, notifying, by the receiver module, the first DBMS that the rewritten labeled statement was received, the notification being performed without executing the labeled statement in the second DBMS;

the first stored procedure or the receiver module being configured for, upon the receiver module having received a result set at least for each of the rewritten labeled statements, triggering the execution of the second stored procedure in the second DBMS, the receiver module thereby using the task-ID and the container-ID of each received rewritten labeled statement for identifying the second stored procedure implementing the requested computational task and for identifying the ones of the second data containers to be used as input or output data containers by the second stored procedure for performing the computational task in the second DBMS.

* * * * *